US012600112B2

(12) United States Patent
Curran et al.

(10) Patent No.: US 12,600,112 B2
(45) **Date of Patent: *Apr. 14, 2026**

(54) NON-AQUEOUS ALUMINUM ANODIZING

(71) Applicant: Apple Inc., Cupertino, CA (US)

(72) Inventors: James A. Curran, Morgan Hill, CA (US); Isabel Yang, San Jose, CA (US); Todd S. Mintz, San Jose, CA (US)

(73) Assignee: APPLE INC., Cupertino, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 18/670,718

(22) Filed: May 21, 2024

(65) Prior Publication Data

US 2024/0326383 A1    Oct. 3, 2024

Related U.S. Application Data

(63) Continuation of application No. 17/654,566, filed on Mar. 11, 2022, now Pat. No. 12,151,453, which is a (Continued)

(51) Int. Cl.
    B32B 15/20 (2006.01)
    B32B 7/12 (2006.01)
    (Continued)

(52) U.S. Cl.
    CPC ............... B32B 15/20 (2013.01); B32B 7/12 (2013.01); C25D 11/04 (2013.01); C25D 11/08 (2013.01);
    (Continued)

(58) Field of Classification Search
    None
    See application file for complete search history.

(56) References Cited

U.S. PATENT DOCUMENTS 3,202,588 A    8/1965  Fromson
3,929,594 A  * 12/1975  Fromson ................ C25D 11/18
                                                          205/112

(Continued)

FOREIGN PATENT DOCUMENTS

CN    102802860 A    11/2012
CN    102834551 B    7/2015
(Continued)

OTHER PUBLICATIONS

PCT International Search Report and Written Opinion for International Application No. PCT/US2019/061734, mailed May 15, 2020 (34 pp.).

(Continued)

*Primary Examiner* — Seth Dumbris
(74) *Attorney, Agent, or Firm* — Dorsey & Whitney LLP

(57)    ABSTRACT

A component for an electronic device can include a part including a first metal and a second metal diffusion bonded to the first metal. The first metal can be aluminum and the second metal can be different from the first metal. A porous aluminum oxide layer can overlie a portion of the first metal and can be disposed adjacent to an interface between the first metal and the second metal. The component can further include a non-metallic material bonded to the part and extending into pores defined by the porous aluminum oxide layer.

18 Claims, 14 Drawing Sheets

Related U.S. Application Data continuation of application No. 17/448,199, filed on Sep. 20, 2021, now abandoned, which is a continuation of application No. 17/138,594, filed on Dec. 30, 2020, now abandoned.

(60) Provisional application No. 63/027,926, filed on May 20, 2020.

(51) Int. Cl.
| | |
|---|---|
| *C25D 11/04* | (2006.01) |
| *C25D 11/08* | (2006.01) |
| *H04M 1/02* | (2006.01) |

(52) U.S. Cl.
CPC ......... *H04M 1/0249* (2013.01); *H04M 1/026* (2013.01); *B32B 2255/06* (2013.01); *B32B 2255/20* (2013.01)

(56) References Cited

U.S. PATENT DOCUMENTS

| | | | |
|---|---|---|---|
| 4,251,330 | A | 2/1981 | Sheasby et al. |
| 5,449,441 | A | 9/1995 | Amor et al. |
| 5,693,207 | A | 12/1997 | Fromson et al. |
| 7,139,633 | B2 | 11/2006 | Mazumder et al. |
| 8,617,661 | B2 | 12/2013 | Newkirk et al. |
| 9,133,559 | B2 | 9/2015 | Silverman et al. |
| 9,833,101 | B2 | 12/2017 | Moon et al. |
| 10,090,877 | B2 | 10/2018 | Rayner |
| 10,478,897 | B2 | 11/2019 | Tong |
| 2008/0164151 | A1 | 7/2008 | Ohmi et al. |
| 2010/0061040 | A1 | 3/2010 | Dabov et al. |
| 2012/0076573 | A1 | 3/2012 | Pilliod et al. |
| 2012/0250250 | A1 | 10/2012 | Tatebe |
| 2013/0008796 | A1 | 1/2013 | Silverman et al. |
| 2013/0081951 | A1 | 4/2013 | Hankey et al. |
| 2013/0153427 | A1 | 6/2013 | Tatebe |
| 2013/0286627 | A1 | 10/2013 | Lee et al. |
| 2015/0135969 | A1 | 5/2015 | Rubio et al. |
| 2015/0261267 | A1 | 9/2015 | Vadakkanmaruveedu et al. |
| 2016/0160371 | A1 | 6/2016 | Chang et al. |
| 2016/0174398 | A1 | 6/2016 | Ido |
| 2016/0207236 | A1 | 7/2016 | Tsubota et al. |
| 2016/0320658 | A1 | 11/2016 | Reightler et al. |
| 2017/0035156 | A1 | 2/2017 | Wright et al. |
| 2017/0069956 | A1 | 3/2017 | Hill et al. |
| 2017/0196110 | A1 | 7/2017 | Shinn |
| 2018/0017995 | A1 | 1/2018 | Gable et al. |
| 2018/0103557 | A1 | 4/2018 | Wright et al. |
| 2019/0045642 | A1 | 2/2019 | Prest et al. |
| 2019/0098785 | A1* | 3/2019 | Mintz .................. H05K 5/0086 |
| 2019/0254185 | A1 | 8/2019 | Cater et al. |
| 2021/0207283 | A1 | 7/2021 | Muranaka et al. |
| 2022/0410535 | A1 | 12/2022 | Curran et al. |

FOREIGN PATENT DOCUMENTS

| | | |
|---|---|---|
| CN | 108611671 A | 10/2018 |
| CN | 109475056 A | 3/2019 |
| DE | 3732206 A1 | 4/1989 |
| GB | 1373962 A | 11/1974 |
| JP | 2013019009 A | 1/2013 |

OTHER PUBLICATIONS

Dutta, B. , et al., "Additive Manufacturing by Direct Metal Deposition", Advanced Materials & Processes, May 2011, pp. 33-36.

Kikuchi, T. , et al., "Porous Aluminum Oxide Formed by Anodizing in Various Electrolyte Species", Current nanoscience, 11(5), https://doi.org/10.2174/1573413711999150608144742, 2015, pp. 560-571.

Norek, M. , et al., "Manufacturing of Highly Ordered Porous Anodic Alumina with Conical Pore Shape and Tunable Interpore Distance in the Range of 550 nm to 650 nm", Materials Science—Poland, 35(3), http://www.materialsscience.pwr.wroc.pl/, DOI: 10.1515/msp-2017-0058, 2017, pp. 511-518.

TRUMPF , "Laser Metal Deposition: Tapping New Potential with Deposition Techniques", TRUMPF Laser-und Systemtechnik, GmbH, available at least as early as Dec. 23, 2020, 8 pp.

Wang, Q. , et al., "Fabrication of highly ordered porous anodic alumina membrane with ultra-large pore intervals in ethylene glycol-modified citric acid solution", J Porous Mater (2013) 20:785-788, DOI 10.1007/s10934-012-9653-3, Nov. 8, 2012.

* cited by examiner

NON-AQUEOUS ALUMINUM ANODIZING

CROSS-REFERENCE TO RELATED APPLICATION(S)

This is a continuation of U.S. patent application Ser. No. 17/654,566, filed 11 Mar. 2022, and entitled "NON-AQUE-OUS ALUMINUM ANODIZING," which is a continuation of U.S. patent application Ser. No. 17/448,199, filed 20 Sep. 2021, and entitled "NON-AQUEOUS ALUMINUM ANODIZING," now abandoned, which is a continuation of U.S. patent application Ser. No. 17/138,594, filed 30 Dec. 2020, and entitled "NON-AQUEOUS ALUMINUM ANODIZING," now abandoned, which claims priority to U.S. Provisional Patent Application No. 63/027,926, filed 20 May 2020, and entitled "NON-AQUEOUS ALUMINUM ANODIZING," the entire disclosures of which are hereby incorporated by reference.

FIELD

The described embodiments relate generally to aluminum anodizing. More particularly, the present embodiments relate to aluminum anodizing using non-aqueous electrolyte solutions.

BACKGROUND

Electronic devices are widespread in society and can take a variety of forms, from wristwatches to computers. Electronic devices, including portable electronic devices such as handheld phones, tablet computers, and watches, can experience contact with various surfaces during use. Further, use, transportation, and storage of such devices can exert mechanical and thermal stresses thereon.

Components for these devices, such as enclosures or housings, can benefit from exhibiting different combinations of properties relating to the use of the device. A housing for a portable electronic device can have a combination of properties, such as strength, appearance, toughness, abrasion resistance, weight, corrosion resistance, thermal conductivity, electromagnetic shielding, and cost, in order for the device to function as desired. Certain metals can provide a desired level of performance with respect to some properties, but may not provide an optimal level of performance with respect to others. Thus, it can be desirable to provide a device enclosure including multiple metals to achieve a desired combination of somewhat disparate properties.

Further, the combination of multiple metals in complex design configurations can introduce complications into traditional manufacturing processes. Enclosures for consumer devices are typically constructed from a combination of metal and non-metal materials in order to provide functional, structural, and cosmetic enhancements. Traditional components formed from only one metal can be modified or treated to enhance the bonding of a non-metal material thereto, and to provide the desired amount of pull strength between the metal and the non-metal material. For components that include two or more different metals, however, traditional processes to enhance the bond strength between the metal component and a non-metal material may not affect each metal in the same way, thus increasing manufacturing complexities. Further, some treatments used for one type of metal can actually degrade or damage a second, different metal of the component. Accordingly, it can be desirable to provide treatment processes that are able to enhance the bond of a non-metal material to a component including two or more different types of metals.

SUMMARY

According to some aspects of the present disclosure, a part can include an aluminum substrate, a second, different metal diffusion bonded to the aluminum substrate, and a porous aluminum oxide layer formed from the aluminum substrate and disposed adjacent to an interface between the aluminum substrate and the second metal.

In some examples, the second metal includes at least one of steel, copper, or tin. The porous aluminum oxide layer can have a thickness of about 10 nanometers (nm) to about 2 microns. The porous aluminum oxide layer defines pores having an average diameter of about 10 nm to about 500 nm. The aluminum substrate defines undercut features having an average diameter of about 10 microns to about 50 microns, and the porous aluminum oxide layer overlies a surface of the aluminum substrate defining the undercut features. The second metal defines undercut features having an average diameter of about 10 microns to about 50 microns. The aluminum and the second metal are immersed in a non-aqueous solution including an electrolyte during an anodizing process that forms the porous aluminum oxide layer.

According to some examples, a method of anodizing a part including aluminum can include immersing the part in a non-aqueous solution including an electrolyte, and applying a voltage to an electrolytic cell including the part and a cathode immersed in the non-aqueous solution to form a porous aluminum oxide layer from at least some of the aluminum.

In some examples, the part includes a second, different metal diffusion bonded to the aluminum. Immersing the part can include immersing the aluminum and the second metal in the non-aqueous solution. The second metal can include at least one of iron, copper, or tin. The non-aqueous solution can include at least one of ethylene glycol or glycerin. The non-aqueous solution can include a nonhydrolyzable organic solvent. The electrolyte can include a weak acid. The electrolyte can include at least one of phosphoric acid, oxalic acid, or citric acid. The voltage can range from about 1 Volt (V) to about 1000 V.

According to some examples, a component for an electronic device can include a part including aluminum and a second, different metal bonded to the aluminum, a porous aluminum oxide layer overlying a portion of the aluminum disposed adjacent to an interface between the aluminum and the second metal, and a non-metallic material bonded to the part and extending into pores defined by the porous aluminum oxide layer.

In some examples, the part is a first part, the porous aluminum oxide layer is a first porous aluminum oxide layer, and the component further includes a second part. The second part can include aluminum and the second metal diffusion bonded to the aluminum. A second porous aluminum oxide layer can overlie a portion of the aluminum on the second part and can be disposed adjacent to an interface between the aluminum and the second metal. The non-metallic material can extend into pores defined by the second porous aluminum oxide layer and bond the first part to the second part. The second metal can define undercut structures and the non-metallic material can fill at least some of undercut structures. The non-metallic material can include a polymer. The second metal can include at least one of iron, copper, or tin.

3

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
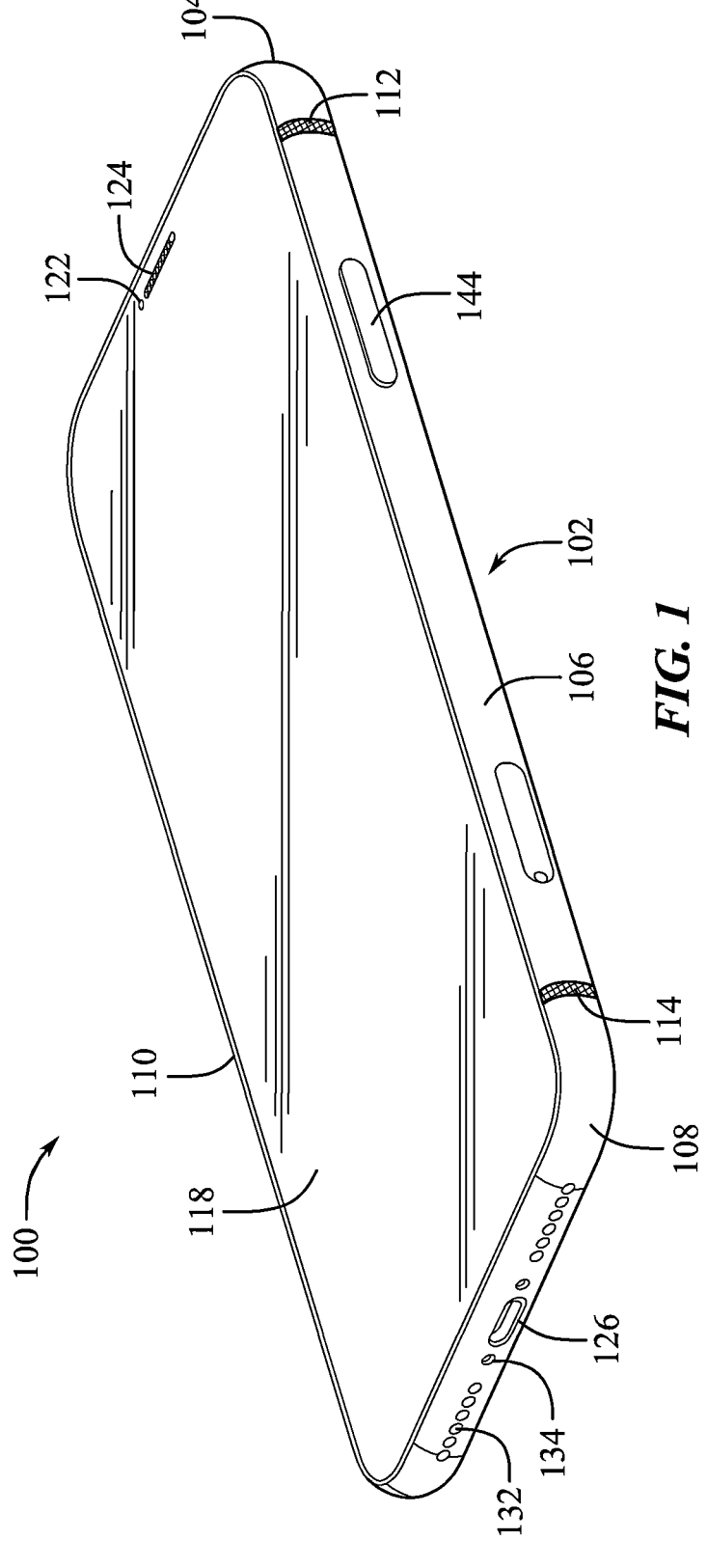
FIG. 1 shows a perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

In some examples, a component for an electronic device, such as an enclosure or housing, can include a first metallic part and a second metallic part. The first and second metallic parts can be joined to one another by a non-metallic material, such as a polymeric material. In some examples, one or both of the first or second metallic parts can include an aluminum portion and a portion of a second, different metal that is diffusion bonded to the aluminum portion. The second metal can include a steel alloy, such as stainless steel. The metallic part can include a porous anodic aluminum oxide layer over at least some of the aluminum portion disposed adjacent to an interface between the aluminum and the second metal. In some examples, the non-metallic material can bond the first and second metallic parts by extending into pores defined by the porous anodic aluminum oxide layer.

Electrochemical oxidation processes, such as anodization, can be carried out on metals such as aluminum and its alloys to form a surface oxide layer thereon. Some traditional anodization processes, such as those carried out using dilute aqueous solutions of sulfuric acid, phosphoric acid, oxalic acid, or mixtures thereof, can form a porous aluminum oxide structure from the aluminum. These anodic porous aluminum oxide films can be several microns or even tens of microns in thickness, with pores having diameters ranging from about 10 nanometers (nm) to about 1 micron in diameter. The pores can also extend through most of the thickness of the aluminum oxide layer.

These anodic aluminum oxide layers can serve a variety of functions. For example, an aluminum oxide layer formed over an aluminum substrate or part can increase the corrosion and wear resistance of the aluminum by acting as a protective layer. An anodic aluminum oxide layer can also be used to color the aluminum through the inclusion of dyes or other materials in the pores. In some examples, it can be desirable to form a porous aluminum oxide layer where the aluminum substrate is to be structurally bonded, for example, to a non-metallic material. The porous aluminum oxide layer can provide a large mesoporous surface area into which the non-metallic material, for example, a polymeric material, can be made to permeate. The penetration of the non-metallic material into the pores of the porous aluminum oxide layer can provide a very strong adhesive bond. In some examples, the bond between the non-metallic material and the porous aluminum oxide layer can have a pull strength of at least about 15 MPa, at least about 20 MPa, at least about 25 MPa, at least about 30 MPa, or greater. This technique can also be used to bond two separate parts including aluminum to one another with a non-metallic material.

In some examples, it can be desirable to form metallic components of an electronic device from a composite structure of two or more different metals. For example, a component can include aluminum and a second metal or material such as a steel alloy. In some examples, the steel alloy can provide a hard, attractive outer surface for the component, while an aluminum alloy core can provide a lightweight structural core having relatively high thermal conductivity that is easily formed or machined. This composite component design can provide levels of appearance, strength, stiffness, weight, manufacturability, and thermal performance that may not be achievable with conventional single metal components.

Traditional anodization processes for forming a porous aluminum oxide layer on the surface of an aluminum part or substrate can use phosphoric acid as the electrolyte in an aqueous electrolyte solution. These traditional aqueous anodization processes, however, are less desirable when applied to a component including aluminum when a second non-anodizable metal, such as steel, is also present. During an anodizing processes, the exposure of any steel that is in electrical contact with the aluminum to the electrolyte can effectively short-circuit the electrochemical aluminum oxide formation process.

When the steel contacts the aqueous electrolyte, it will draw most of the current and will actively corrode during processes carried out at the anodic potentials required for porous aluminum oxide formation. Under conventional anodizing conditions, hundreds of microns of steel will dissolve, and the adjacent aluminum will not achieve the necessary potential to grow a porous aluminum oxide layer. Adjusting various parameters of the process can slightly slow the dissolution of steel, but the steel will still undesirably evolve oxygen gas. Other approaches to anodizing a part including aluminum and a non-anodizable material such as steel in an aqueous solution, such as by masking the steel portion, can still be subject to issues such as defects in the mask that could cause a whole batch of parts to fail to achieve a desired porous aluminum oxide layer. Moreover, small physical dimensions of some parts can make masking an extremely complex or even impossible solution.

Accordingly, in some examples, a porous aluminum oxide layer can be formed on the aluminum portion of a part including aluminum and a second, non-anodizable metal by a non-aqueous anodization process. In some examples, a non-aqueous anodization process, as described herein, can include immersing the part in a non-aqueous solution including an electrolyte. In some examples, phosphoric acid can be used as the electrolyte and a non-aqueous liquid, such as ethylene glycol, can be used as the solution or solvent. Thus, in some examples, a non-aqueous anodization process can be referred to as a non-aqueous phosphoric acid anodizing (NAPA) process. Without wishing to be bound by any one theory, the use of a non-aqueous solvent, such as ethylene glycol, instead of water can eliminate the undesirable hydrolysis of water and the associated oxygen gas evolution on the non-anodizable metal portion, thus avoiding the short-circuiting of the electrolytic cell and allowing the formation of a porous aluminum oxide film on the aluminum portion.

These and other embodiments are discussed below with reference to FIGS. 1-11C. However, those skilled in the art will readily appreciate that the detailed description given herein with respect to these Figures is for explanatory purposes only and should not be construed as limiting.

FIG. 1 illustrates a perspective view of an embodiment of an electronic device 100. The electronic device 100 shown in FIG. 1 is a mobile wireless communication device (a smartphone, for example). The smartphone of FIG. 1 is merely one representative example of a device that can be used in conjunction with the systems and methods disclosed herein. Electronic device 100 can correspond to any form of wearable electronic device, a portable media player, a media storage device, a portable digital assistant ("PDA"), a tablet computer, a computer, a mobile communication device, a GPS unit, a remote control device, or other electronic device. The electronic device 100 can be referred to as an electronic device or a consumer device.

The electronic device 100 can have a housing or an enclosure that includes a band or a frame 102 that defines an outer perimeter of the electronic device 100. The band 102, or portions thereof, can be or can include a composite metallic component, as described herein. In some examples, the band 102 can include several sidewall components, such as a first sidewall component 104, a second sidewall component 106, a third sidewall component 108 (opposite the first sidewall component 104), and a fourth sidewall component 110. The aforementioned sidewall components can be or can include a composite metallic component, as described herein.

In some instances, some of the sidewall components form part of an antenna assembly (not shown in FIG. 1). As a result, a non-metal material, or materials, can separate the sidewall components of the band 102 from each other in order to electrically isolate the sidewall components. For example, a first separating material 112 separates the first sidewall component 104 from the second sidewall component 106, and a second separating material 114 separates the second sidewall component 106 from the third sidewall component 108. The aforementioned materials can include a non-metallic material, for example, a polymeric material. In some examples, the non-metallic material can be electrically inert, or insulating, such as plastics and/or resin, as non-limiting examples.

The electronic device 100 can further include a display assembly 118 that can include a transparent protective cover that at least partially defines an exterior surface of the device 100. The display assembly 118 can include multiple layers, with each layer providing a unique function. In some examples, the transparent protective cover can be formed from a transparent material, such as glass, plastic, sapphire, or similar transparent materials. In this regard, the protective cover can be referred to as a transparent cover, a transparent protective cover, or a cover glass (when the protective cover includes glass). As shown in FIG. 1, the protective cover of the display includes one or more openings 122, 124. The openings 122, 124 can allow for transmission of acoustical energy (in the form of audible sound) into or out of the electronic device 100. In some examples, acoustic signals transmitted into the device 100 can be received by a microphone (not shown in FIG. 1). Further, the opening 124 can allow for transmission of acoustical energy (in the form of audible sound) out of the electronic device 100, which can be generated by an audio module (not shown in FIG. 1).

The electronic device 100 can further include a port 126 designed to receive a connector of a cable assembly. The port 126 allows the electronic device 100 to communicate data information (send and receive), and also allows the electronic device 100 to receive electrical energy to charge a battery assembly. Accordingly, the port 126 can include terminals that electrically couple to the connector.

Furthermore, the electronic device 100 can include several openings. For example, the electronic device 100 can include openings 132 that allow an additional audio module (not shown in FIG. 1) of the electronic device to emit acoustical energy out of the electronic device 100. The electronic device 100 can also include features to receive a fastener 134 designed to be fastened to a rail that is coupled to the display assembly 118. In this way, the fastener 134 can be designed to couple the display assembly 118 with the band 102.

The electronic device 100 can include several control inputs designed to provide a command to the electronic device 100. For example, the electronic device 100 can include a control input 144. The aforementioned control input can be used to adjust the visual information presented on the display assembly 116 or the volume of acoustical energy output by an audio module, as non-limiting examples. The control input can include one of a switch, a sensor, or a button designed to generate a command to a processor circuit. The control input can at least partially extend through an opening in the sidewall components. For example, the second sidewall component 106 can include or define an opening that receives the control input 144. Further details of an exemplary electronic device are provided below with reference to FIG. 2.

Figure 2:
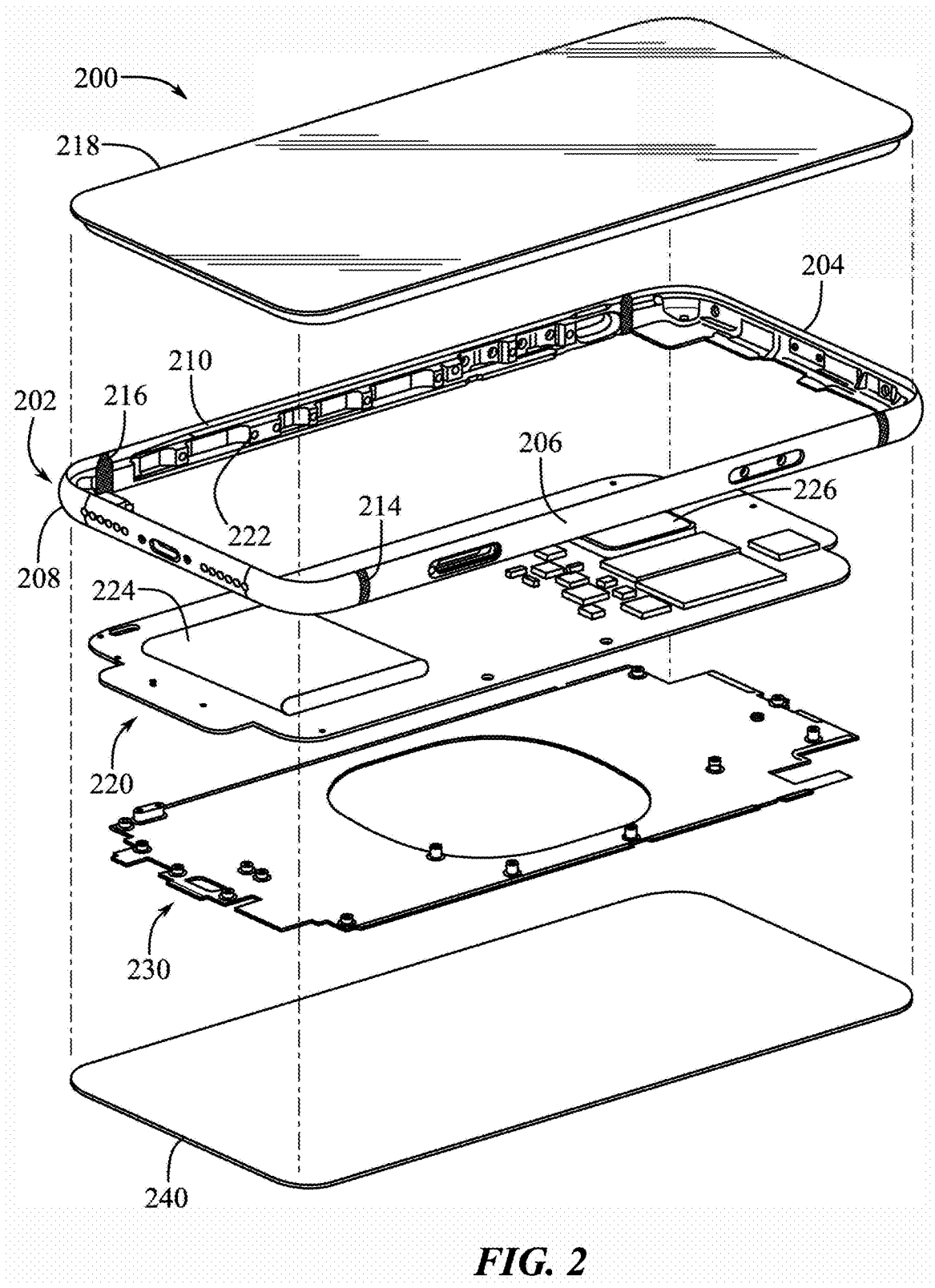
FIG. 2 shows an exploded view of an electronic device.

FIG. 2 illustrates an exploded view of an electronic device 200. The electronic device 200 shown in FIG. 2 is a smartphone, but is merely one representative example of a device that can include or be used with the systems and methods described herein. As described with respect to electronic device 100, electronic device 200 can also correspond to any form of wearable electronic device, a portable media player, a media storage device, a portable digital assistant ("PDA"), a tablet computer, a computer, a mobile communication device, a GPS unit, a remote control device, and other electronic devices. In some examples, the electronic device 200 can include some or all of the features described herein, with respect to electronic device 100.

The electronic device 200 can have a housing that includes a band 202 that at least partially defines an exterior portion, such as an outer perimeter of the electronic device. As with the band 102 described above in FIG. 1, the band 202 can include several sidewall components, such as a first sidewall component 204, a second sidewall component 206, a third sidewall component 208 (opposite the first sidewall component 204), and a fourth sidewall component 210. The aforementioned sidewall components can be or can include a composite metallic component, as described herein. The band 202 can also include a non-metal material or materials that separate and/or join the sidewall components of the band 202 with each other, as described herein. For example, separating material 214 can separate and/or join the second sidewall component 206 with the third sidewall component 208, while separating material 216 can separate the third sidewall component 208 from the fourth sidewall component 210.

The housing, including the band 202, can include one or more features to receive or couple to other components of the device 200, such as feature 222. For example, the band 202 can include any number of features such as apertures, cavities, indentations, and other mating features configured to receive and/or attach to one or more components of the device 200. The electronic device 200 can include internal components such as processors, memory, circuit boards, batteries, and sensors. Such components can be disposed within an internal volume defined, at least partially, by the band 202, and can be affixed to the band 202, via internal surfaces, attachment features such as feature 222, threaded connectors, studs, posts, and/or other fixing features, that are formed into, defined by, or otherwise part of the band 202.

The device 200 can include internal components, such as a system in package (SiP) 226, including one or more integrated circuits such as a processors, sensors, and memory. The device 200 can also include a battery 224 housed in the internal volume of the device 200. The device 200 can also include one or more sensors, such as optical or other sensors, that can sense or otherwise detect information regarding the environment exterior to the internal volume of the device 200. Additional components, such as a haptic engine, can also be included in the device 200. The electronic device 200 can also include a display assembly 218, similar to display assembly 118 described herein. In some examples, the display assembly 218 can be received by and/or attached to the band 202 by one or more attachment features.

The electronic device 200 can further include a chassis 220 that can provide structural support. The chassis 220 can include a rigid material, such as a metal, or can include a composite construction, as described herein. The chassis 220 can also be coupled to the band 202. In this manner, the chassis 220 can provide an electrical grounding path for components electrically coupled to the chassis. The electronic device can alternatively or additionally include a back plate 230 having cladding layers and/or other attachment features such that one or more components of the electronic device 200 can be attached to the back plate 230, for example, via welding. The back plate 230 can form conductive pathways for connecting components of the electronic device 200. In some examples, the back plate 230 can be attached to the band 202 of the device 200 by one or more attachment features, such as feature 222.

An exterior surface of the electronic device 200 can further be defined by a back cover 240 that can be coupled with the band 202. In this regard, the back cover 240 can combine with the band 202 to form an enclosure or a housing of the electronic device 200, with the enclosure or housing (including band 202 and back cover 240) at least partially defining an internal volume. The back cover 240 can include a transparent material, such as glass, plastic, sapphire, or another transparent material.

The housing, including the band 202 of one or more composite components, can be conformable to interior dimensional requirements, as defined by the internal components. For example, the structure of the housing including a composite band 202 can be defined or limited exclusively or primarily by the internal components the housing is designed to accommodate. That is, because a housing including a composite band 202 can be extremely light and strong, the housing can be shaped to house the interior components in a dimensionally efficient manner without being constrained by factors other than the dimensions of the components, such as the need for additional structural elements. The composite components 204, 206, 208, 210 of the band can include an aluminum portion and a second non-anodizable portion, such as a stainless steel portion that is bonded thereto. At least the surface of the aluminum portion of the composite components 204, 206, 208, 210 that are bonded to the separating components, such as components 214, 216, can have a porous aluminum oxide layer formed thereon according to the processes described herein.

While any number or variety of components of an electronic device can be formed from or can include a part including aluminum and a porous aluminum oxide layer formed by a non-aqueous anodization process, the structure of these components can be, for example, a composite component including an aluminum portion joined to a second, non-anodizable portion, as described herein. The structure of the aluminum portion and the non-anodizable portion, and the materials of the non-anodizable portion, as well as the composite component itself, can apply not only to the specific examples discussed herein, but to any number or variety of embodiments in any combination. Various embodiments of components, electronic devices, and methods of forming the same are described below with reference to FIGS. 3-5.

Figures 3, 4:
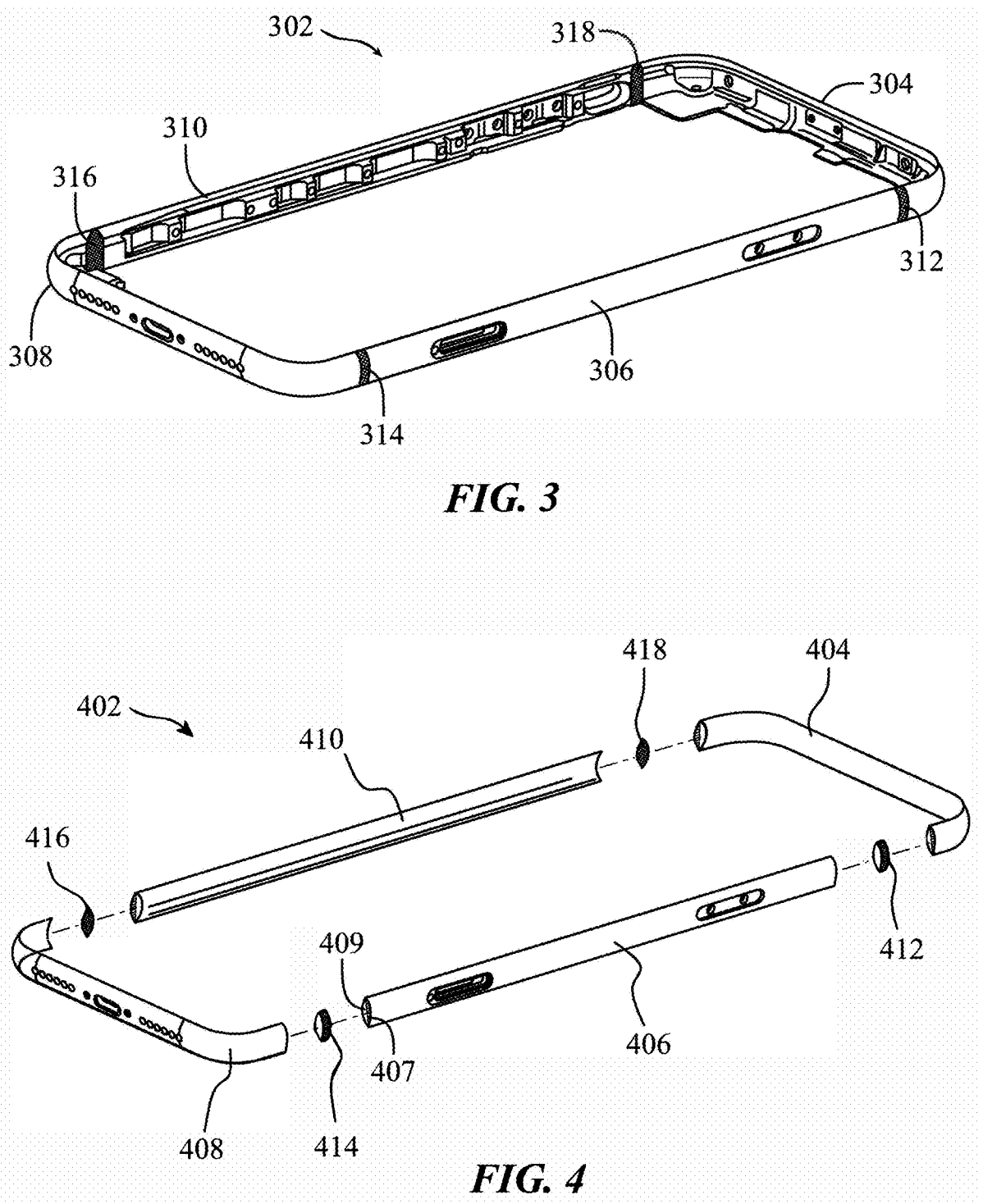
FIG. 3 shows a perspective view of a housing of an electronic device.
FIG. 4 shows an exploded view of a housing of an electronic device.

FIG. 3 shows a perspective view of a band 302 of a housing or enclosure of an electronic device, while FIG. 4 shows an exploded view of a band 402 of a housing or enclosure of an electronic device. The bands 302, 402 can, for example, be part of a housing or enclosure for an electronic device substantially similar to electronic device 100 or electronic device 200 described with respect to FIGS. 1 and 2.

The band 302 can include one or more portions that are composite components or that include composite components, such as an exterior portion including a non-anodizable material joined to an interior portion including aluminum, as described herein. For example, the band 302 can include a first composite sidewall component 304, a second composite sidewall component 306, a third composite sidewall component 38 (opposite the first composite sidewall component 304), and a fourth composite sidewall component 310. In some examples, and as described herein, the composite components 304, 306, 308, 310 can be separated and/or joined together by portions of non-metallic material 312, 314, 316, 318 that can penetrate pores defined by a porous aluminum oxide layer formed over at least some of the aluminum of the composite component.

As shown in FIG. 4, a composite sidewall component 406 of the band 402 can include an exterior portion 407 that can be formed from a relatively hard, strong, attractive, and/or durable non-anodizable material, such as steel. An interior portion 409 of the composite sidewall component 406 can include aluminum or an aluminum alloy and can be diffusion bonded to the exterior portion 407. The aluminum interior portion 409 can be easily machinable to allow for the low-cost formation of attachment features and can be relatively light weight, with a high thermal conductivity. As described further herein, a porous aluminum oxide layer can be formed over at least those regions of the interior portion 409 that are bonded to the non-metallic material 412, 414 to provide a high strength bond and structural integrity to the band 402. In some examples, features can also be formed on those regions of the exterior portion that are bonded to the non-metallic material 412, 414. Importantly, the porous aluminum oxide layer can be formed on the interior portion 409 after it has been bonded to the exterior portion 407, allowing for traditional device manufacturing or assembly processes to be used after the porous aluminum oxide layer has been formed, thereby reducing costs. The band 402 can further include additional composite sidewall components 404, 408, and 410 that can be separated and/or joined together by portions of non-metallic material 412, 414, 416, 418 as described herein. Further, in some examples, the composite components can form portions of the housing or enclosure other than the sidewalls, such as a top portion, bottom portion, or any portion of the housing or enclosure. Further details of composite sidewall components are provided below with reference to FIG. 5.

Figure 5:
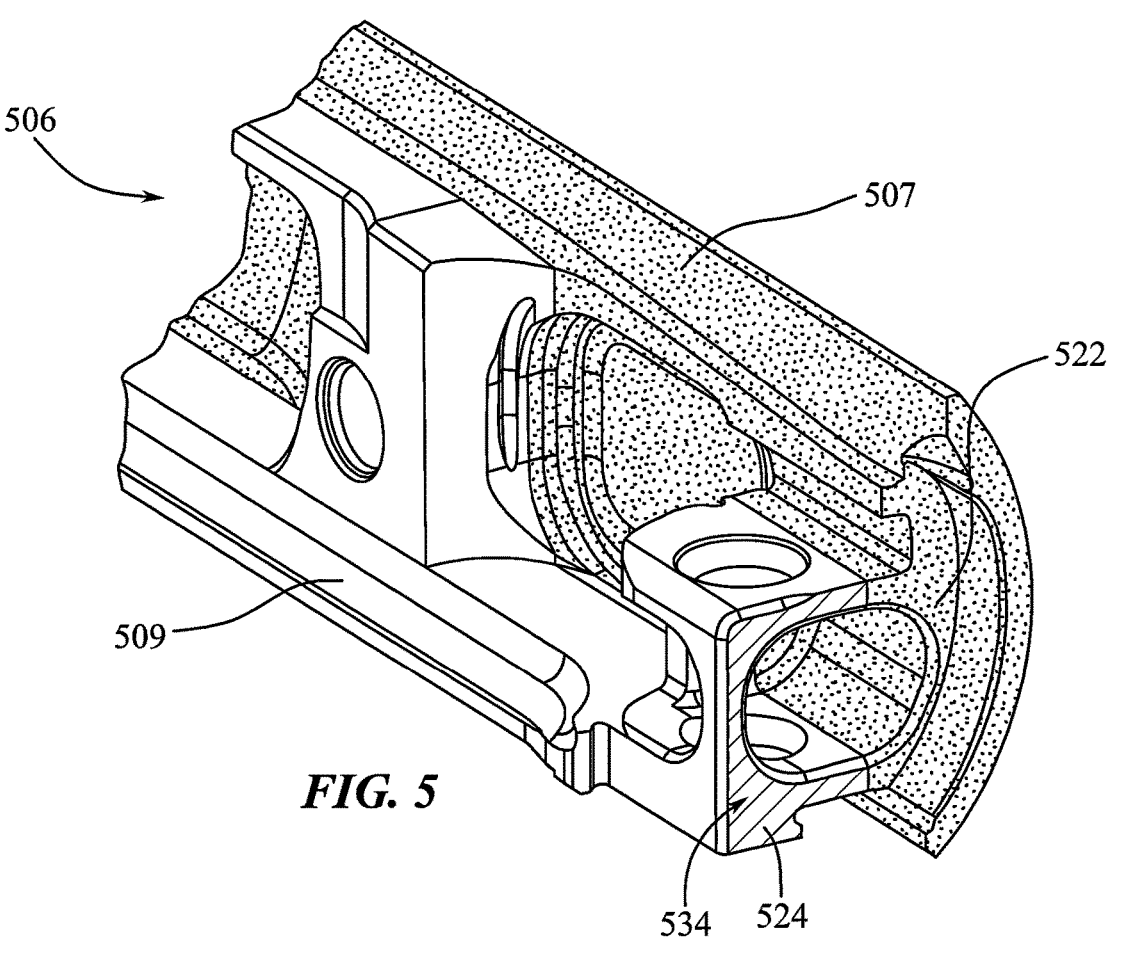
FIG. 5 shows a close-up perspective view of a portion of a housing of an electronic device.

FIG. 5 shows an exemplary composite metallic component 506 that can include a pre-formed exterior portion 507 including a non-anodizable material joined to an interior portion 509 including aluminum. In some examples, the component 506 can be substantially similar to, or the same as, the component 406 described with respect to FIG. 4. In some examples, the non-anodizable material can include at least one of iron, copper, or tin. In some examples, the non-anodizable material can include a steel alloy, such as stainless steel. In some examples, the non-anodizable material can include a conductive material such as graphite, graphene, or carbon fiber. The composite component 506 can include a first bonding surface 522 that is defined by the exterior portion 507, and a second bonding surface 524 that is defined by the interior portion 509. As can be seen, the surfaces 522, 524 can abut each other along an interface between the portions 507, 509.

In some examples, the surface 522 can include one or more engagement features formed thereon. For example, the surface 522 can include multiple engagement features. As described herein, the engagement features can range in size from nano- or micro-scaled features to macro-scale features having dimensions on the order or millimeters. In some examples, the engagement features can have any desired shape to engage a non-metallic material, as described herein. For example, an engagement feature can include a recess, a cavity, a protrusion, an undercut feature, or combinations thereof. In some examples, an engagement feature can include an undercut feature having an average diameter of about 10 microns to about 50 microns.

In some examples, the surface 524 can include or be overlaid by a porous aluminum oxide layer 534 that has been formed thereon by a non-aqueous anodization process, as described herein. In some examples, the porous aluminum oxide layer has a thickness of about 10 nm to about 2 microns. In some examples, the porous aluminum oxide layer defines pores having an average diameter of about 10 nm to about 500 nm. In some examples, the porous aluminum oxide layer defines pores including an opening at a surface of the porous aluminum oxide having an average major dimension of about 10 nm to about 500 nm. In some examples, the pores can be regularly arranged or spaced, although in some examples the pores can have an irregular or substantially random distribution. In some examples, the surface 524 can include one or more engagement features or interlock features formed thereon, the engagement feature or features can be defined by the porous aluminum oxide layer. For example, an engagement feature can include a recess, a protrusion, or combinations thereof. In some examples, an engagement feature can include an undercut feature having an average diameter of about 10 microns to about 50 microns.

In some examples, the surfaces 522, 524, can allow the composite component 506 to be joined or bonded to a non-metallic material, as described herein. In some examples, the non-metallic material can also be bonded to second component, thereby joining the composite component 506 to the second component. For example, a non-metallic material can mechanically engage the engagement features and the pores of the porous aluminum oxide layer 534 to join the component 506 with another component, such as component 308, illustrated and described with respect to FIG. 3.

While any number or variety of components of an electronic device can be formed from, or can include a part including, aluminum and a porous aluminum oxide layer formed by a non-aqueous anodization process, the structure of these components can be, for example, a composite component including an aluminum portion joined to a second, non-anodizable portion, as described herein. The structure of the aluminum portion and the non-anodizable portion, and the materials of the non-anodizable portion, as well as the composite component itself, can apply not only to the specific examples discussed herein, but to any number or variety of embodiments in any combination. Various embodiments of components, electronic devices, and methods of forming the same are described below with reference to FIG. 6.

Figure 6:
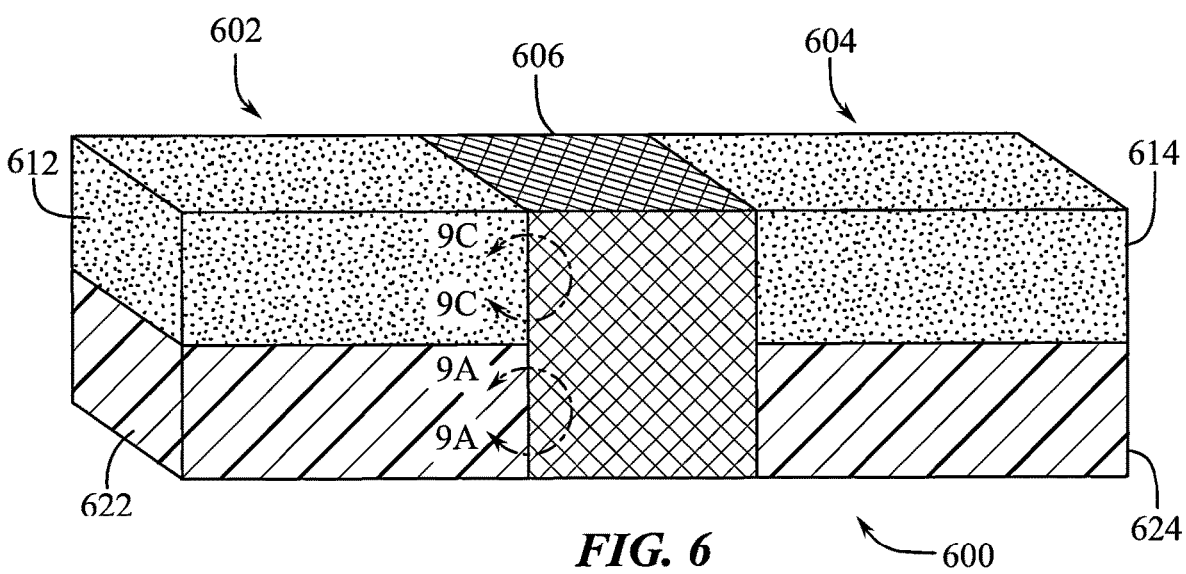
FIG. 6 shows a perspective view of a component of an electronic device.

FIG. 6 shows a perspective view of a component 600 of an electronic device including a first part 602 joined or bonded to a second part 604 by a non-metallic material 606, as described herein. In some examples, one or both of the first part 602 or the second part 604 can be a composite part including a non-anodizable portion 612, 614 and an aluminum portion 622, 624. In some examples, an aluminum portion 622, 624 can include aluminum or any anodizable alloy thereof. The non-anodizable portion 612, 614 can be joined or bonded to the aluminum portion 622, 624 along an interface between the two portions. In some examples, however, one or both of the first part 602 and/or the second part 604 can include only an aluminum portion 622, 624.

In some examples, a non-anodizable portion 612, 614 can be pre-formed and can include a metallic material, such as stainless steel, although other materials are expressly contemplated, as described herein. In some examples, a non-anodizable portion 612, 614 can have a thickness greater than about 25 microns. In some examples, a non-anodizable portion 612, 614 and an aluminum portion 622, 624 can be welded, bonded, diffusion bonded, adhered, or otherwise joined together such that they form the part 602, 604, or a portion thereof, and act as a composite body. That is, in some examples, the composite part 602, 604 can be treated as a single piece of material with any process, such as the processes described herein, including manufacturing and assembly processes. The non-anodizable portion 612, 614 and the aluminum portion 622, 624 can include any desired shape or design, and thus the part 602, 604 can include any desired shape or design. In some examples, the component 600 can be a portion of a housing of an electronic device. In some other examples, however, the component 600 can be any component of an electronic device, such as a structural component, an internal component, an external component, and/or any other component.

In some examples, a non-anodizable portion 612, 614 can include any material that does not allow for the formation of an anodic porous aluminum oxide layer on the aluminum portion 622, 624 by a conventional aqueous anodization process. In some examples, a non-anodizable portion 612, 614 can include a ferrous or iron-containing metal. For example, a non-anodizable portion 612, 614 can include any steel alloy, such as a stainless steel alloy. In some examples, a non-anodizable portion 612, 614 can include a metallic material, such as iron, copper, tin, or combinations, or alloys thereof. In some examples, however, a non-anodizable portion 612, 614 can include a non-metallic material, such as a conductive non-metallic material. In some examples, a non-anodizable portion 612, 614 can include graphite.

In some examples, and as described herein, the non-metallic material 606 can include an electrically inert, or insulating, material(s), such as plastics and/or resin, as non-limiting examples. In some examples, the non-metallic material 606 may not be insulating, however. In some examples, the non-metallic material 606 can include polymeric materials, glass materials, ceramic materials, or combinations thereof. In some examples, the non-metallic material 606 can include a flowable material. That is, in some examples, the non-metallic material 606 can include any material that can be made to flow or move at least partially into the pores of a porous aluminum oxide layer, as described herein. In some examples, the non-metallic material 606 can include a material capable of changing or transitioning between a flowable state and a substantially solid, or non-flowable state, for example, by cooling, curing, or any other process or technique.

While any number or variety of components of an electronic device can be formed from, or can include a part including, aluminum and a porous aluminum oxide layer formed by a non-aqueous anodization process, the structure of these components can be, for example, a composite component including an aluminum portion joined to a second, non-anodizable portion, as described herein. The structure of the aluminum portion and the non-anodizable portion, and the materials of the non-anodizable portion, as well as the composite component itself, can apply not only to the specific examples discussed herein, but to any number or variety of embodiments in any combination. Various embodiments of components, electronic devices, and methods of forming the same are described below with reference to FIGS. 7A-7B.

Figure 7A:
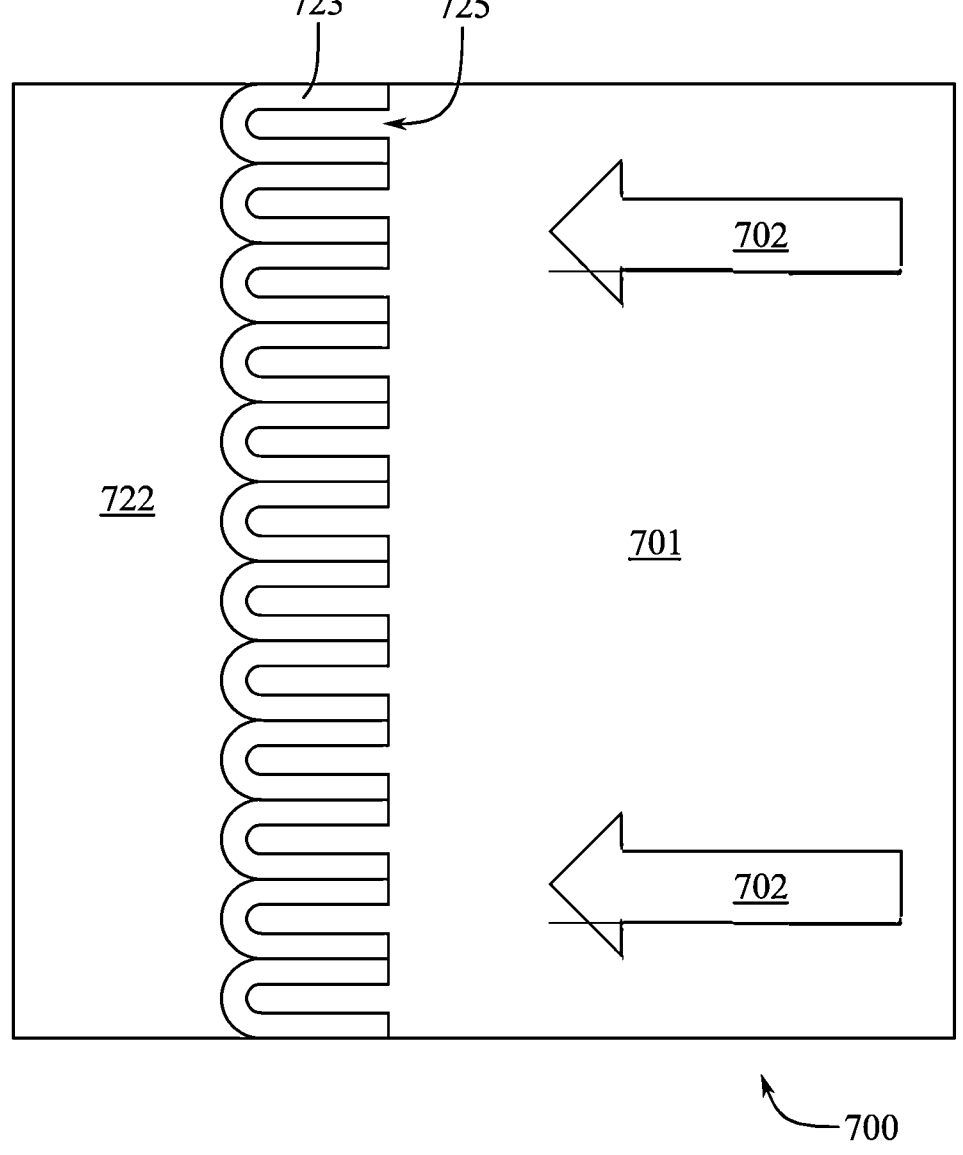
FIG. 7A shows a schematic view of an aluminum part undergoing an anodizing process.

FIG. 7A shows a schematic view of an aluminum part undergoing an anodizing or anodization process. The process can include submerging an aluminum part or substrate 722 in an electrolyte solution 701. The aluminum substrate 722 can act as the anode of an electrolytic cell 700 including the electrolyte solution 701, a cathode (not shown) that is also immersed in the electrolyte solution 701, and a voltage source or power supply (not shown). In order to perform the anodization process and begin forming the porous aluminum oxide film 723, a voltage can be supplied to the electrolytic cell 700, which can cause a current 702 to flow through the electrolyte solution 701 and form the porous aluminum oxide film 723 from the aluminum substrate 722. As can be seen, the porous aluminum oxide film 723 can define a number of pores 725 that can be regularly or irregularly spaced or distributed.

In some examples, the diameter of the pore can be controlled by controlling the voltage during the process. For example, the diameter of the pores can be on the order of nanometers and can be from about 5 nm to about 500 nm, or even up to 1 micron. In some examples, the voltage supplied to the electrolytic cell 700 can be from about 2 Volts (V) to about 500 V. In some examples, a higher voltage supplied to the electrolytic cell 700 can form a porous aluminum oxide film 723 having pores 725 with a larger diameter. If the electrolyte solution 701 includes water or is an aqueous solution, then the process described with respect to FIG. 7A can be considered a traditional or conventional anodization process. In some examples, however the electrolyte solution 701 can be a non-aqueous solution and can include a non-aqueous solvent, as described herein. Additional details regarding conventional anodization processes are described with respect to FIG. 7B.

Figure 7B:
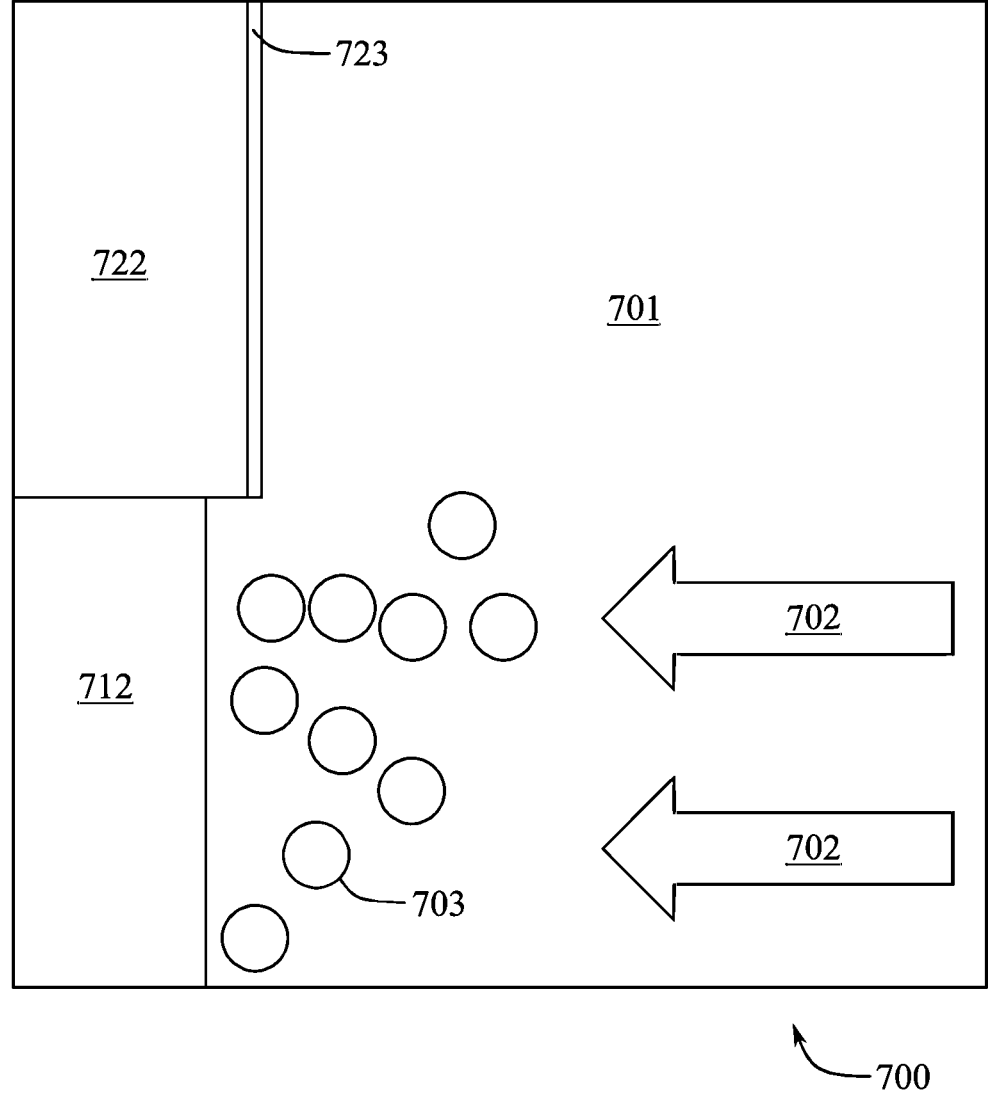
FIG. 7B shows a schematic view of a part including multiple metals undergoing an anodizing process. 20

FIG. 7B shows a schematic view of a part including an aluminum portion 722 and a non-anodizable portion 712, such as steel, immersed in an aqueous electrolyte solution 701 and acting as the anode of the electrolytic cell 700 described with respect to FIG. 7A. As can be seen, when a voltage is supplied to the electrolytic cell 700, the exposure of any of the non-anodizable material 712 that is in electrical contact with the aluminum portion 722 to the aqueous electrolyte solution 701 can effectively short-circuit the electrochemical aluminum oxide formation process and can cause all or substantially all of the current 702 to flow to the non-anodizable portion 712.

When the non-anodizable portion 712 contacts the aqueous electrolyte solution 701, it will actively corrode during processes carried out at the anodic potentials required for porous aluminum oxide formation. Under conventional anodizing conditions, hundreds of microns of the non-anodizable portion 712 can dissolve, and the adjacent aluminum portion 722 will not achieve the necessary potential to grow a porous aluminum oxide layer, instead forming only a relative thin, non-porous aluminum oxide layer 723. The electrochemical reaction(s) that draw the current 702 to the non-anodizable portion 712 and cause its corrosion can also result in undesirable hydrolysis of the water in the aqueous electrolyte solution 701 and the evolution of relatively large amounts of oxygen gas 703 at the non-anodizable portion 712.

While any number or variety of components of an electronic device can be formed from or can include a part including aluminum and a porous aluminum oxide layer formed by a non-aqueous anodization process, the structure of these components can be, for example, a composite component including an aluminum portion joined to a second, non-anodizable portion, as described herein. The structure of the aluminum portion and the non-anodizable portion, and the materials of the non-anodizable portion, as well as the composite component itself, can apply not only to the specific examples discussed herein, but to any number or variety of embodiments in any combination. Various embodiments of components, electronic devices, and methods of forming the same are described below with reference to FIG. 8.

Figure 8:
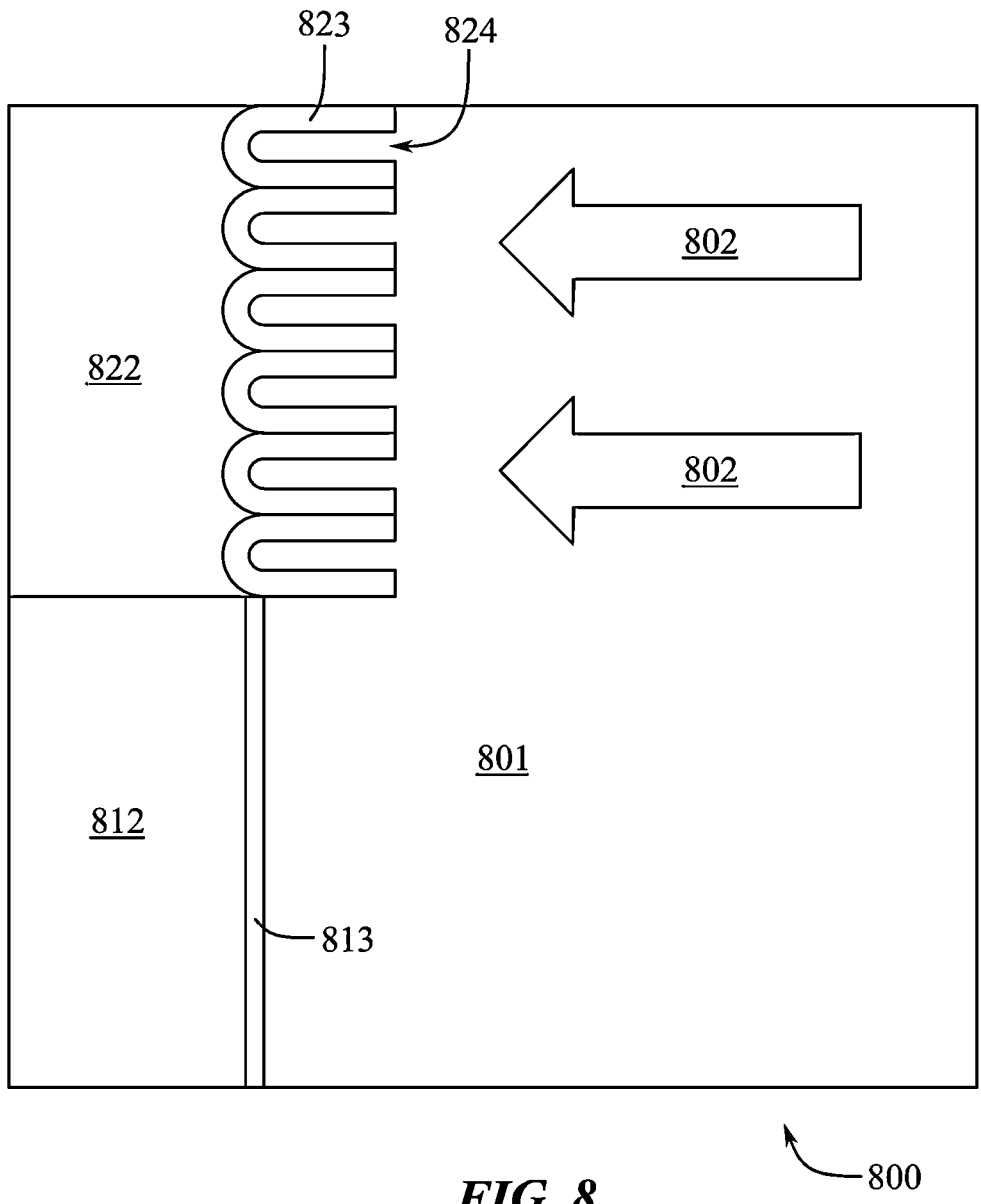
FIG. 8 shows a schematic view of a part including multiple metals undergoing an anodizing process.

FIG. 8 shows a schematic view of a part including an aluminum portion 822 and an adjacent non-anodizable portion 812, such as steel, immersed in a non-aqueous electrolyte solution 801 and acting as the anode of an electrolytic cell 800. The electrolytic cell 800 can include a cathode (not shown) that is also immersed in the electrolyte solution 801, and a voltage source or power supply (not shown). In some examples, the electrolytic cell 800 can be substantially similar to the electrolytic cell 700, except that the electrolyte solution 801 is non-aqueous. Without wishing to be bound by any one theory, in some examples, the use of a non-aqueous electrolyte solution 801 instead of an aqueous electrolyte solution can eliminate the undesirable hydrolysis of water and the associated oxygen gas evolution on the non-anodizable portion 812, thus avoiding the short-circuiting of the electrolytic cell 800 and allowing sufficient current 802 to flow to the aluminum portion 822 to form a porous aluminum oxide film or layer 823 from the aluminum portion 822. The porous aluminum oxide film 823 can define pores 824 that can be substantially similar to the pores 725 defined by the porous aluminum oxide film 723. In some examples, the porous aluminum oxide film 823 can be substantially adjacent to the non-anodizable portion 812. Additionally, in some examples, the anodization process can cause the formation of a passivation layer or oxide layer 813 on the surface of the non-anodizable portion 812. Accordingly, the electrolytic cell 800 can be used to carry out a non-aqueous anodization process, as described herein.

In some examples, the electrolyte solution 801 can include a non-aqueous solvent and one or more electrolytes. In some examples, the solvent can include an organic solvent. In some examples, the solvent can include a non-hydrolyzable organic solvent. That is, the solvent can include an organic solvent that does not undergo hydrolysis when a voltage is supplied to the electrolytic cell 800. In some examples, the non-aqueous solvent includes at least one of ethylene glycol or glycerin. In some examples, the electrolyte can include any electrolyte used in a traditional aluminum anodization process. In some examples, the electrolyte can include a weak acid. The term "weak acid" is used herein to refer to any acid that is only partially dissociated into a proton and an anion, with both the undissociated acid and its dissociation products being present, in solution, in equilibrium with each other. In some examples, the electrolyte can include at least one of phosphoric acid, oxalic acid, or citric acid. In some examples, the electrolyte can include any combination of weak acids. In some examples, the solvent can include ethylene glycol, and the electrolyte can include phosphoric acid. Accordingly, in some examples, the non-aqueous electrolyte solution 801 can include ethylene glycol and phosphoric acid. In some examples, the non-aqueous electrolyte solution 801 can have a pH of less than 7, for example, less than about 6.8, less than about 6.6, less than about 6.5, less than about 6.4, or less than about 6.3 or lower. In some examples, the electrolyte solution 801 can include between an electrolyte to solvent ratio of about 10 grams per liter (g/L) and about 1000 g/L, for example, about 100 g/L.

In some examples, a voltage between about 1V and about 1000V can be supplied to the electrolytic cell 800, as desired. In some examples, the part including the aluminum portion 822 and the adjacent non-anodizable portion 812 can have an anodic potential of between about 5V and about 100V, between about 25V and about 75V, or between about 50V and about 70V. In some examples, the part can have an anodic potential of about 65V. In some examples, the surface of the aluminum portion 822 can have a current density of between about 0.01 Ampere per square decimeter (ASD) and about 10 ASD, for example, about 0.5 ASD.

Further, in some examples, the non-aqueous electrolyte solution 801 can be heated during the anodization process. For example, the non-aqueous electrolyte solution 801 can be heated to about 25° C., about 30° C., about 35° C., about 40° C., about 45° C., about 50° C., or more. In some examples, the cathode of the electrolytic cell 800 can include a metallic material, such as stainless steel.

In some examples, the porous aluminum oxide film 823 can have a thickness of between about 10 nm to about 2 microns, as desired. In some examples, the thickness of the porous aluminum oxide film 823 can depend at least partially on the duration of time that a voltage is supplied to the electrolytic cell 800. In some examples, the pores 824 can have an average diameter of from about 5 nm to about 500 nm, or even up to 1 micron. In some examples, the pores 824 can have an average diameter of from about 10 nm to about 250 nm, from about 20 nm to about 150 nm, from about 30 nm to about 100 nm, or from about 40 nm to about 60 nm. In some examples, the pores 824 can have an average diameter of about 50 nm.

While any number or variety of components of an electronic device can be formed from, or can include a part including, aluminum and a porous aluminum oxide layer formed by a non-aqueous anodization process, the structure of these components can be, for example, a composite component including an aluminum portion joined to a second, non-anodizable portion, as described herein. The structure of the aluminum portion and the non-anodizable portion, and the materials of the non-anodizable portion, as well as the composite component itself, can apply not only to the specific examples discussed herein, but to any number or variety of embodiments in any combination. Various embodiments of components, electronic devices, and methods of forming the same are described below with reference to FIGS. 9A-10B.

Figure 9A:
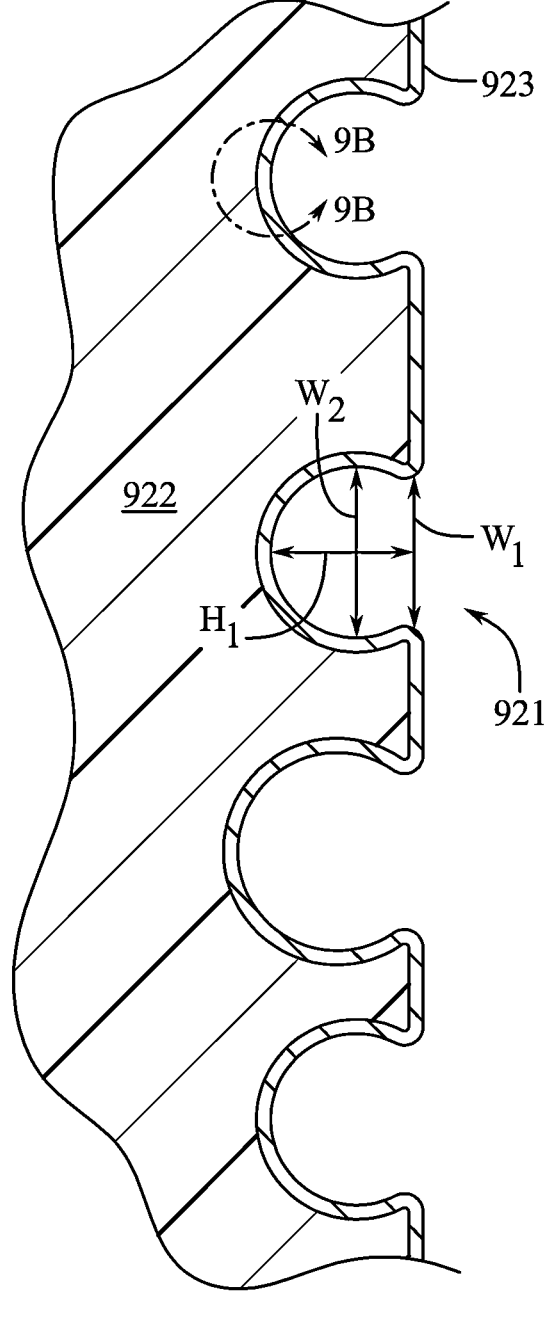
FIG. 9A shows a cross-sectional view of a portion of a component of an electronic device.

FIG. 9A illustrates a close-up cross-sectional view of a region of an aluminum portion 922 substantially similar to the aluminum portion 622 of the first part 602 indicated in FIG. 6. As described herein, the aluminum portion 922 can have a porous aluminum oxide layer 923 formed thereon and overlying at least a portion of the surface of the aluminum portion 922. Further, in addition to the pores defined by the porous aluminum oxide layer 923, the aluminum portion 922 can define any number, size, and/or shape of additional interlocking features, such as undercut feature 921. In some examples, the porous aluminum oxide layer 923 can be disposed over the surface of the aluminum portion 922 that defines the feature 921.

In some examples, the aluminum portion 922 and/or the porous aluminum oxide layer 923 can define an opening having a first width $W_1$ that can lead to an undercut region that extends at least partially into and is further defined by the aluminum portion 922 and/or the porous aluminum oxide layer 923. In some examples, the first width $W_1$ can be between about 5 microns and about 100 microns, or between about 10 microns and about 50 microns, for example, about 30 microns. This undercut region can have a second width $W_2$ that is wider than the first width $W_1$. In some examples, the second width $W_2$ can be between about 5 microns and about 100 microns, or between about 10 microns and about 50 microns, for example, about 35 microns. The undercut region of the feature 921 can have a height $H_1$. The height $H_1$ can also be considered a distance or depth that the feature 921 extends into the aluminum portion 922. In some examples, a ratio of the height $H_2$ to the second width $W_2$ of the feature 921 can be between about 0.5 and about 1, or between about 0.6 and about 0.9. Although illustrated as having a substantially spherical or rounded undercut shape, in some examples, the features 921 can have substantially any shape or variety of shapes, as desired, including regular and/or irregular shapes or combinations thereof.

In some examples, the features 921 can be formed in the aluminum portion 922 prior to the formation of the porous aluminum oxide layer 923 therefrom. In some examples, the features 921 can be formed by any process or combination of processes, such as etching and/or machining processes.

Figure 9B:
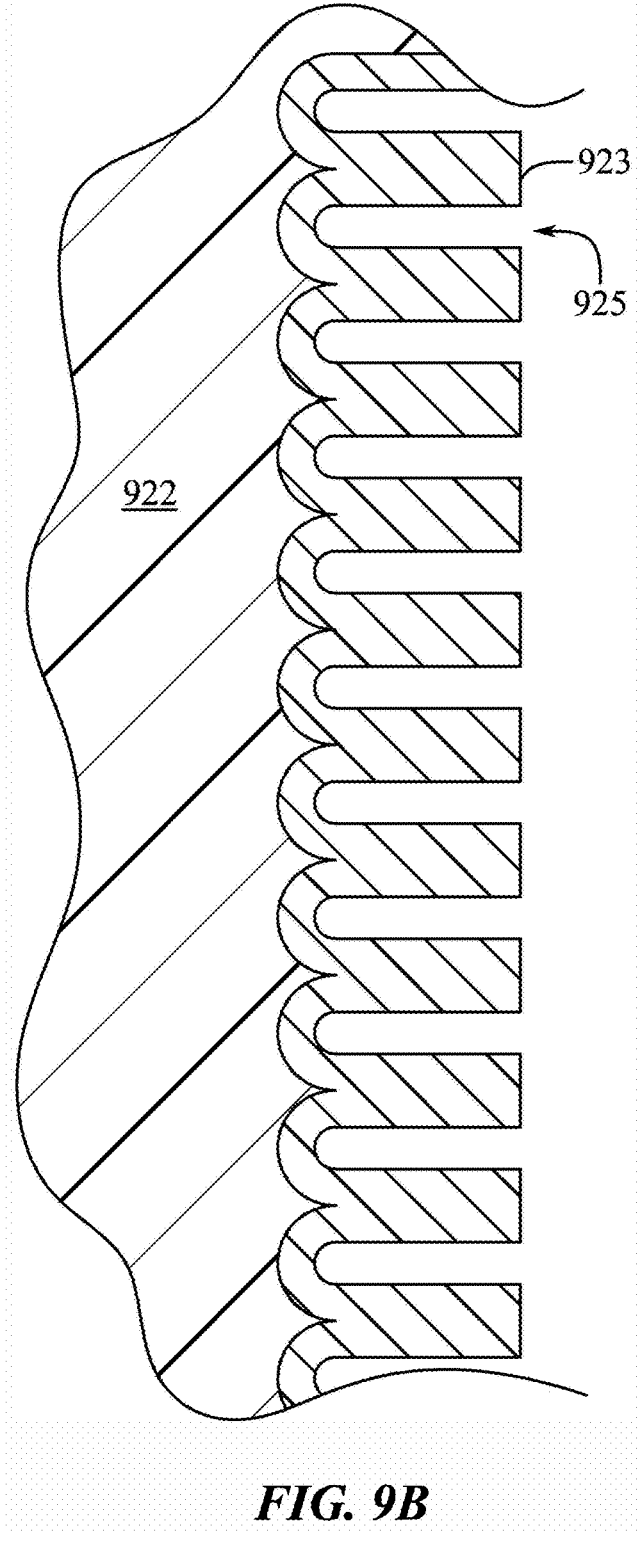
FIG. 9B shows a close-up cross-sectional view of a 25 portion of the component of FIG. 9A.

FIG. 9B illustrates a close-up cross-sectional view of the region indicated in FIG. 9A, including the porous aluminum oxide layer 923 defining a plurality of pores 925. In some examples, the pores 925 can extend from a substantially planar or flat external surface of the aluminum oxide layer 923 towards the aluminum portion 922. The pores 925 can have generally columnar shapes that are elongated in a direction generally perpendicular the surface of the aluminum portion 922 on or from which the aluminum oxide layer 923 is formed. In some examples, the pores 925 are defined by walls of the aluminum oxide layer 923. Additionally, the pores 925 can be defined by bottom surfaces of the aluminum oxide layer 923. In some examples, the pores 925 can extend substantially an entire depth of the aluminum oxide layer 923. In some examples, the bottom surfaces of the aluminum oxide layer 923 that can define a bottom portion of the pores can have a thickness on the order of nanometers and can have a thickness similar to a thickness of the walls of the aluminum oxide layer 923, for example, between about 1 nm to about 50 nm. Additional details of a composite part including an aluminum portion and a non-anodizable portion are described with respect to FIG. 9C.

Figure 9C:
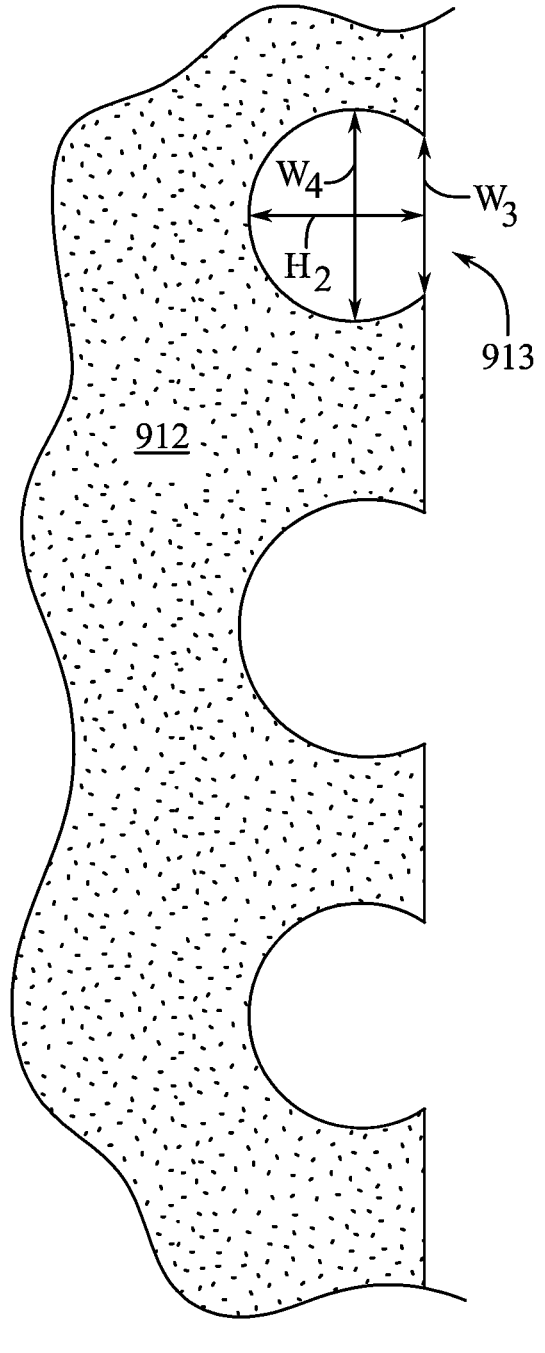
FIG. 9C shows a cross-sectional view of a portion of a component of an electronic device.

FIG. 9C illustrates a close-up cross-sectional view of a region of a non-anodizable portion 912 substantially similar to the non-anodizable portion 612 of the first part 602 indicated in FIG. 6. In some examples, all or a portion of the surface of the non-anodizable portion 912 can define any number, size, and/or shape of additional interlocking features, such as undercut feature 913.

In some examples, the non-anodizable portion 912 can define an opening having a first width $W_3$ that can lead to an undercut region that extends at least partially into and is further defined by the non-anodizable portion 912. In some examples, the first width $W_3$ can be between about 5 microns and about 100 microns, or between about 10 microns and about 50 microns, for example, about 30 microns. This undercut region can have a second width $W_4$ that is wider than the first width $W_3$. In some examples, the second width $W_4$ can be between about 5 microns and about 100 microns, or between about 10 microns and about 50 microns, for example, about 35 microns. The undercut region of the feature 913 can have a height $H_2$. The height $H_2$ can also be considered a distance or depth that the feature 913 extends into the non-anodizable portion 912. In some examples, a ratio of the height $H_2$ to the second width $W_4$ of the feature 913 can be between about 0.5 and about 1, or between about 0.6 and about 0.9. Although illustrated as having a substantially spherical or rounded undercut shape, in some examples, the features 913 can have substantially any shape or variety of shapes, as desired, including regular and/or irregular shapes, or combinations thereof.

In some examples, the features 921 can be formed in the non-anodizable portion 912 prior to the formation of a porous aluminum oxide layer 923 on an adjacent aluminum portion 922. In some examples, the features 913 can be formed by any process or combination of processes, such as etching and/or machining processes. In some examples, the features 913 can be formed by the non-aqueous anodization processes described herein, for example, at the same time the porous aluminum oxide layer 923 is formed on an adjacent aluminum portion 922.

Figure 10A:
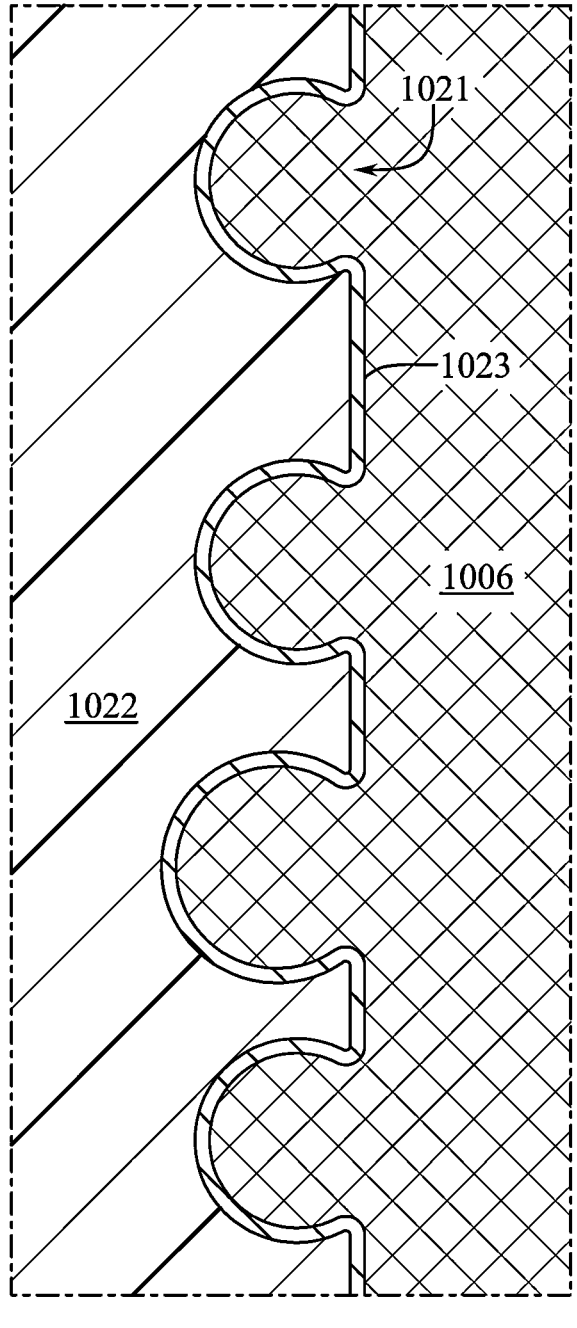
FIG. 10A shows a cross-sectional view of a portion of a component of an electronic device.

FIG. 10A illustrates a close-up cross-sectional view of an aluminum portion 1022 of a part, as described herein. The aluminum portion 1022 can be substantially similar to the aluminum portion 922 described herein, and can be included in a part including a non-anodizable portion bonded thereto, or can be a part by itself. In some examples, the aluminum portion 1022 can define one or more undercut features 1021 that can include the porous aluminum oxide film 1023 (illustrated in FIG. 10B) formed therein. The porous aluminum oxide layer 1023 can be formed by a non-aqueous anodization process, as described herein.

As described herein and with respect to FIG. 10A, a non-metallic material 1006 can be bonded or joined to the aluminum portion 1022 and can at least partially fill or line the undercut features 1021 defined by the aluminum portion 1022. In some examples, the non-metallic material 1006 can completely or substantially completely fill one or all of the undercut features 1021. Accordingly, in some examples, there may be substantially no gaps or spacing between the portions of the non-metallic material 1006 disposed in the undercut features 1021 and the surface of the porous aluminum oxide layer 1023 and/or aluminum portion 1022 defining the features 1021. In some examples, the features 1021 can increase the surface area of the aluminum portion 1022, thereby enhancing the bond strength between the aluminum portion 1022 and the non-metallic material 1006. Additionally, the undercut nature of the features 1021 can provide a level of mechanical engagement between the features 1021 and the non-metallic material 1006, thereby enhancing the bond strength.

Figure 10B:
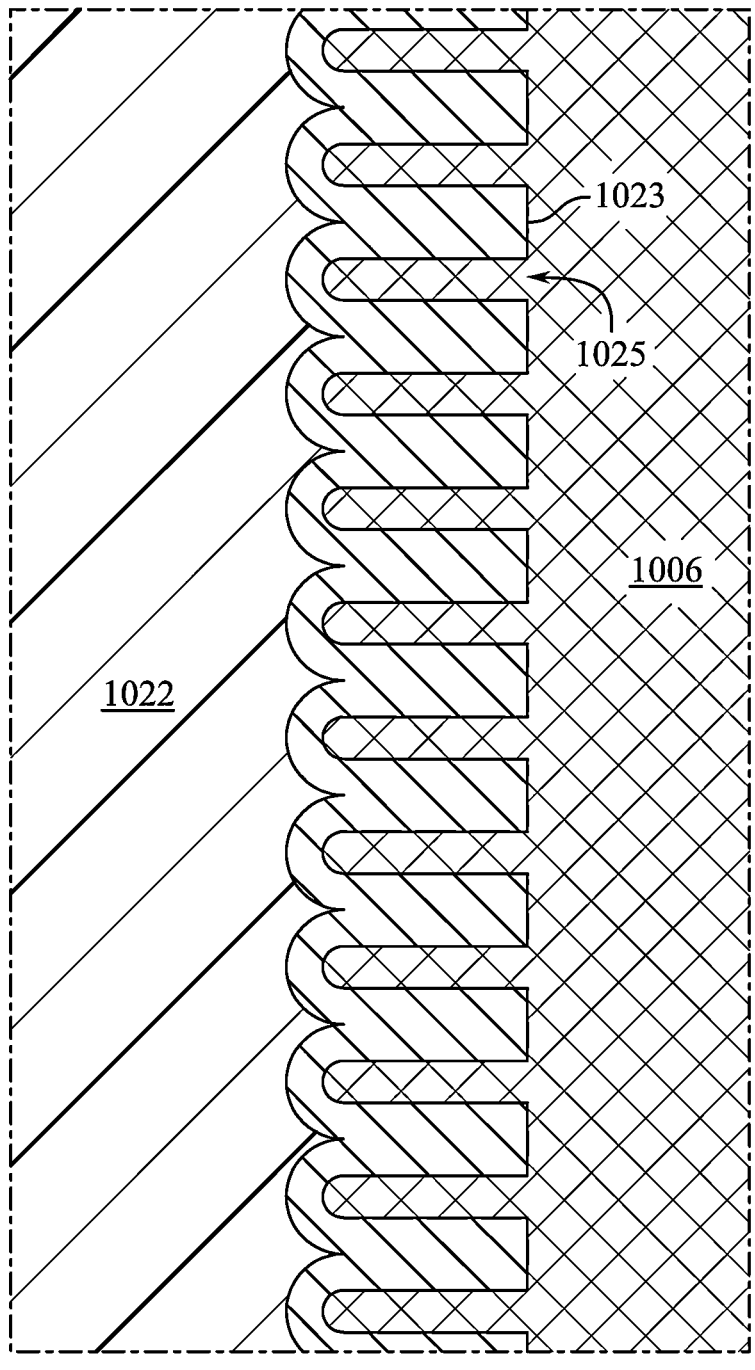
FIG. 10B shows a close-up cross-sectional view of a portion of the component of FIG. 10A.

FIG. 10B illustrates a close-up cross-sectional view of the porous aluminum oxide layer 1023 of the aluminum portion 1022 including the non-metallic material 1006 extending at least partially into the pores 1025 defined by the porous aluminum oxide layer 1023.

In some examples, the penetration of the non-metallic material 1006 at least partially into the pores 1025 can enhance the bond or pull strength between the aluminum portion 1022 and the non-metallic material 1006. In some examples, those portions of the non-metallic material 1006 disposed and/or retained within the pores 1025 can be referred to as chemically and/or mechanically bonded at the nanometer scale, while those portions of the non-metallic material 1006 disposed and/or retained within the features 1021 illustrated in FIG. 10A can be referred to as mechanically bonded at the micrometer scale. In some examples, the bond between the non-metallic material 1006 and the porous aluminum oxide layer 1023 can have a pull strength of at least about 15 MPa, at least about 20 MPa, at least about 25 MPa, at least about 30 MPa, or greater.

While any number or variety of components of an electronic device can be formed from, or can include a part including, aluminum and a porous aluminum oxide layer formed by a non-aqueous anodization process, the structure of these components can be, for example, a composite component including an aluminum portion joined to a second, non-anodizable portion, as described herein. The structure of the aluminum portion and the non-anodizable portion, and the materials of the non-anodizable portion, as well as the composite component itself, can apply not only to the specific examples discussed herein, but to any number or variety of embodiments in any combination. Various embodiments of components, electronic devices, and methods of forming the same are described below with reference to FIGS. 11A-11C.

Figure 11A:
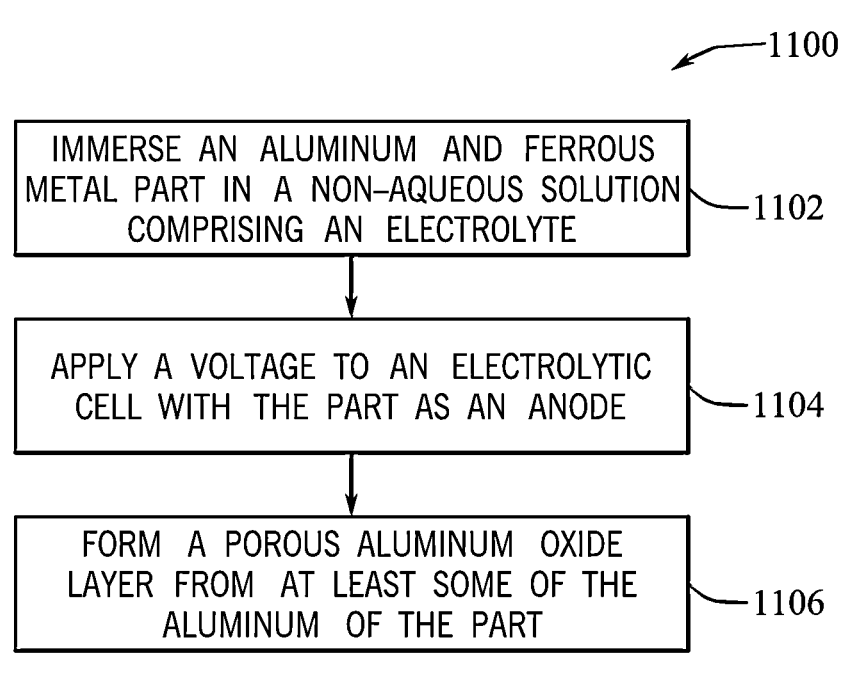
FIG. 11A shows a process flow diagram of a method of anodizing a part including aluminum.

FIG. 11A shows a process flow diagram of a method 1100 of anodizing a part including an aluminum portion and a non-anodizable portion, such as a ferrous metal portion. At block 1102, the part can be immersed in a non-aqueous solution including an electrolyte. In some examples, the non-aqueous solution can include a non-aqueous solvent and one or more electrolytes. In some examples, the solvent can include an organic solvent. In some examples, the solvent can include a nonhydrolyzable organic solvent. In some examples, the non-aqueous solvent includes at least one of ethylene glycol or glycerin. In some examples, the electrolyte can include any electrolyte used in a traditional aluminum anodization process. In some examples, the electrolyte can include a weak acid. In some examples, the electrolyte can include at least one of phosphoric acid, oxalic acid, or citric acid. In some examples, the electrolyte can include any combination of weak acids. In some examples, the solvent can include ethylene glycol and the electrolyte can include phosphoric acid.

At block 1104, a voltage can be applied to an electrolytic cell including a cathode and the part acting as an anode, as described herein. In some examples, a voltage between about 1V and about 1000V can be applied to the electrolytic cell, as desired. In some examples, the part can have an anodic potential of between about 5V and about 100V, between about 25V and about 75V, or between about 50V and about 70V. In some examples, the part can have an anodic potential of about 65V. In some examples, the surface of the aluminum portion of the part can have a current density of between about 0.01 Ampere per square decimeter (ASD) and about 10 ASD, for example, about 0.5 ASD.

At block 1106, a porous aluminum oxide layer is formed from at least some of the aluminum of the part, as described herein. The porous aluminum oxide layer can be disposed on some or all of a surface of the aluminum portion. Although described as a separate block, it should be understood that the formation of the aluminum oxide layer can occur concurrently with the application of the voltage to the electrolytic cell in block 1106.

Figure 11B:
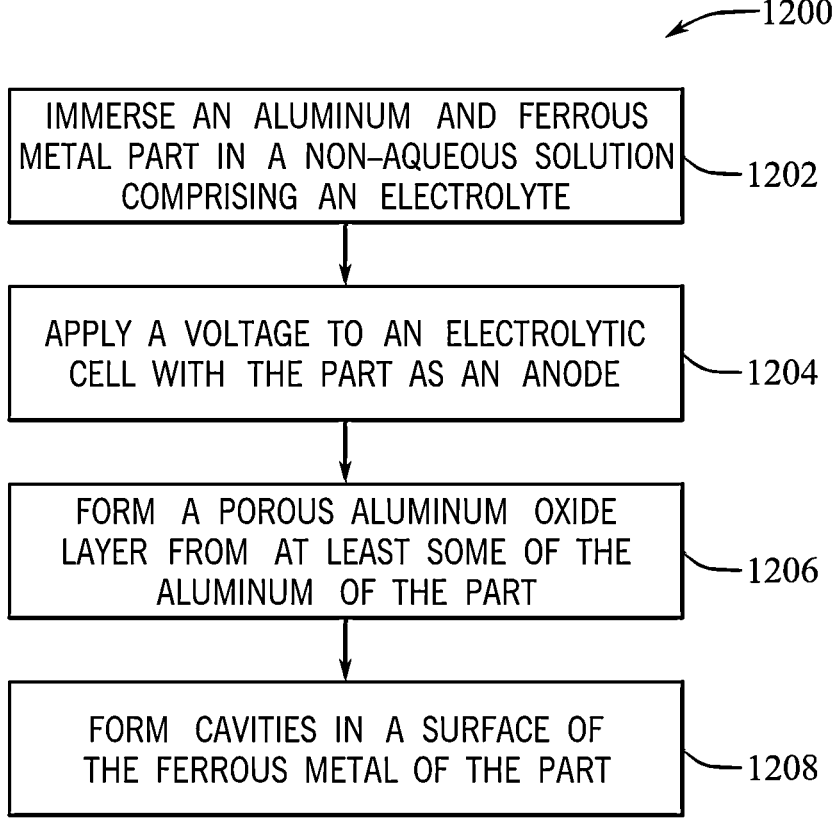
FIG. 11B shows a process flow diagram of a method of anodizing a part including aluminum and a ferrous metal.

FIG. 11B shows a process flow diagram of a method 1200 of anodizing a part including aluminum and a ferrous metal, as described herein. At block 1202, the part can be immersed in a non-aqueous solution including an electrolyte. In some examples, the non-aqueous solution can include a non-aqueous solvent and one or more electrolytes. In some examples, block 1202 can be substantially similar to, or the same as block 1102. At block 1204, a voltage can be applied to an electrolytic cell including a cathode and the part acting as an anode, as described herein. In some examples, block 1204 can be substantially similar to, or the same as block 1104. At block 1206, a porous aluminum oxide layer is formed from at least some of the aluminum of the part, as described herein. In some examples, block 1206 can be substantially similar to, or the same as block 1106 and can occur simultaneously or concurrently with block 1204. At block 1208, cavities or features can be formed in or on a surface of the ferrous metal, or non-anodizable portion of the part. In some examples, the cavities can include undercut features, such as the features 913 described with respect to FIG. 9C. Although described as a separate block, it should be understood that the formation of the cavities can occur concurrently with the one or both of blocks 1204, 1206. In some examples, however, block 1208 can occur at a different time and can be due to one or more processes carried out prior or subsequent to blocks 1202, 1204, and/or 1206.

Figure 11C:
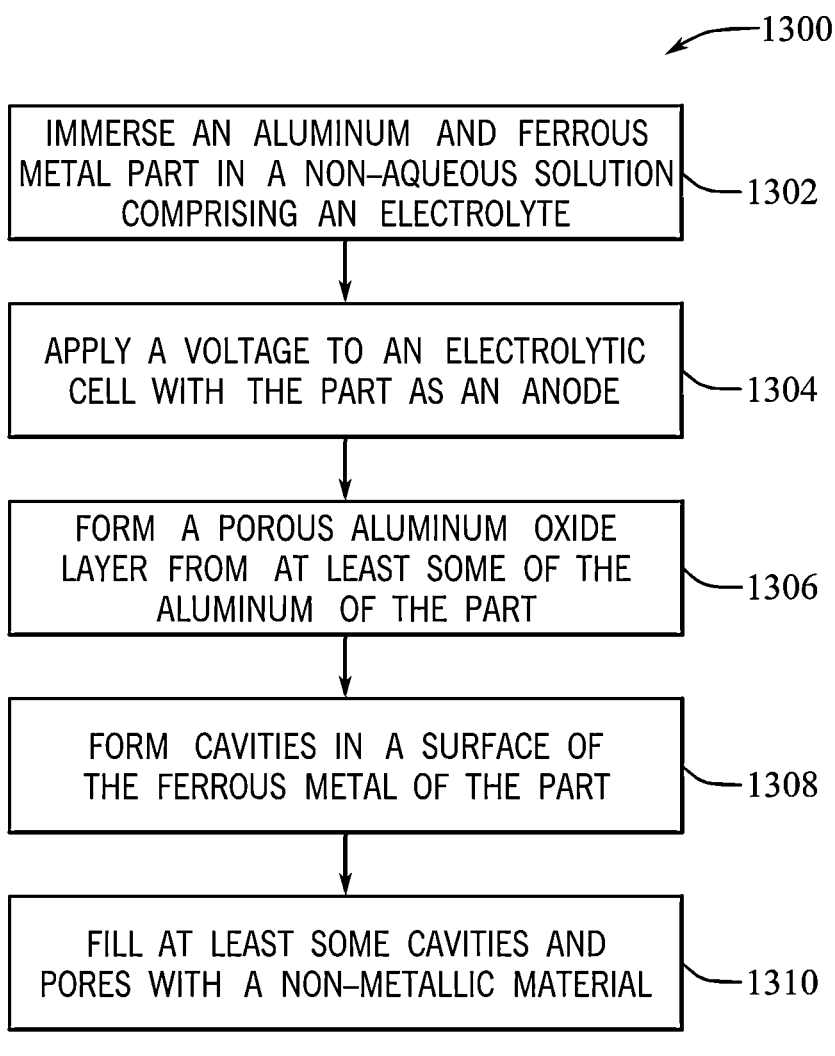
FIG. 11C shows a process flow diagram for forming a component of an electronic device.

FIG. 11C shows a process flow diagram of a method 1300 of forming a component, such as a component for an electronic device. At block 1302, the part including aluminum and a ferrous metal or other non-anodizable material, as described herein, can be immersed in a non-aqueous solution including an electrolyte. In some examples, the non-aqueous solution can include a non-aqueous solvent and one or more electrolytes. In some examples, block 1302 can be substantially similar to, or the same as blocks 1102, 1202. At block 1304, a voltage can be applied to an electrolytic cell including a cathode and the part acting as an anode, as described herein. In some examples, block 1304 can be substantially similar to, or the same as blocks 1104, 1204. At block 1306, a porous aluminum oxide layer is formed from at least some of the aluminum of the part, as described herein. In some examples, block 1306 can be substantially similar to, or the same as blocks 1106, 1206, and can occur simultaneously or concurrently with block 1304.

At block 1308, cavities or features can be formed in or on a surface of the ferrous metal, or non-anodizable portion of the part. In some examples, the cavities can include undercut features, such as the features 913 described with respect to FIG. 9C. Although described as a separate block, it should be understood that the formation of the cavities can occur concurrently with one or both of blocks 1304, 1306. In some examples, however, block 1308 can occur at a different time and can be due to one or more processes carried out prior or subsequent to blocks 1302, 1304, and/or 1306. In some examples, block 1308 can be substantially similar to, or the same as, block 1208.

At block 1310, at least some of the cavities defined by the ferrous metal portion and/or pores defined by the porous aluminum oxide layer can be at least partially filled with a non-metallic material, as described herein.

In some examples, and as described herein, the non-metallic material can include an electrically inert, or insulating, material(s), such as plastics and/or resin, as non-limiting examples. In some examples, the non-metallic material may not be insulating. In some examples, the non-metallic material can include polymeric materials, glass materials, ceramic materials, or combinations thereof. In some examples, the non-metallic material can include a flowable material and can be made to flow or move at least partially into the pores and/or cavities of the part as described herein. In some examples, the non-metallic material can include a material capable of changing or transitioning between a flowable state and a substantially solid, or non-flowable state, for example, by cooling, curing, or any other process or technique.

Any of the features or aspects of the components, devices, and methods discussed herein can be combined or included in any varied combination. For example, any methods of forming a porous aluminum oxide film can be used on any of the components, parts, or features of electronic devices described herein. The steps, stages, or blocks of any of the methods described herein can be performed in any desired order and can be performed simultaneously if desired. Further, a housing of a device can include a part including a porous aluminum oxide film formed by a non-aqueous anodization process as described herein. Although certain methods and components are described with respect to housings, enclosures, or frames for electronic devices, the methods and components described herein can also be or form any number of additional components of an electronic device, including internal components, external components, cases, surfaces, or partial surfaces. As used herein, the terms exterior, outer, interior, and inner are used for reference purposes only. An exterior or outer portion of a composite component can form a portion of an exterior surface of the component, but may not necessarily form the entire exterior or outer surface thereof.

To the extent applicable to the present technology, gathering and use of data available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions.

The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A part, comprising:
a substrate comprising a first metal;
   a second metal secured to the substrate and defining an external surface of the part, the first metal comprising aluminum and the second metal being different from the first metal;
a porous aluminum oxide layer formed from the substrate and disposed adjacent to an interface between the substrate and the second metal; and
a non-metallic material coupled directly to the second metal and the porous aluminum oxide layer, the non-metallic material positioned orthogonally to the interface.

2. The part of claim 1, wherein the second metal is denser than the first metal.

3. The part of claim 1, wherein the non-metallic material comprises a polymer.

4. The part of claim 1, wherein the external surface is curved.

5. The part of claim 1, wherein the non-metallic material comprises a flowable material.

6. The part of claim 5, wherein the flowable material is disposed within a plurality of pores of the porous aluminum oxide layer.

7. A housing for an electronic device, comprising:
a sidewall comprising:
   a first metal defining an external surface; and
   a second metal secured directly to the first metal defining an interface between the second metal and the first metal, the second metal being less dense than the first metal and including a porous oxide layer;
an oxide layer formed on a surface of the second metal; and
a polymeric portion coupled directly to the oxide layer and the first metal, and positioned orthogonally to the interface.

8. The housing of claim 7, wherein the second metal comprises aluminum.

9. The housing of claim 7, wherein the polymeric portion comprises plastic.

10. The housing of claim 7, wherein the polymeric portion comprises resin.

11. The housing of claim 7, wherein the oxide layer includes etched engagement features.

12. The housing of claim 11, wherein the polymeric portion is interlocked with the engagement features.

13. The housing of claim 7, wherein the first metal is secured to the second metal via a surface interlocking structure.

14. A component for an electronic device, comprising:
a part comprising:
   a metal;
   aluminum secured directly to the metal; and
   a porous aluminum oxide layer defining at least one of a plurality of pores or etched engagement features, the porous aluminum oxide layer overlying at least some of the aluminum and disposed adjacent to an interface between the aluminum and the metal; and
a non-metallic material bonded to the metal and the porous aluminum oxide layer and extending into the plurality of pores, the non-metallic material positioned perpendicular to the interface.

15. The component of claim 14, wherein the aluminum is disposed between the non-metallic material and the metal.

16. The component of claim 14, wherein the etched engagement features defines undercut features and the non-metallic material fills at least some of the undercut features.

17. The component of claim 14, wherein the non-metallic material comprises a polymer.

18. The component of claim 17, wherein the non-metallic material comprises at least one of plastic or resin.

* * * * *